United States Patent
Kasai et al.

(10) Patent No.: US 8,665,963 B2
(45) Date of Patent: Mar. 4, 2014

(54) COMMUNICATION TERMINAL, CONTENT REPRODUCTION METHOD, CONTENT REPRODUCTION PROGRAM, AND CONTENT REPRODUCTION SYSTEM FOR DISTRIBUTING AND REPRODUCING VIDEO CONTENTS WITH REDUCED STRESS

(75) Inventors: Hiroyuki Kasai, Tokyo (JP); Naofumi Uchihara, Tokyo (JP); Hirono Tsubota, Osaka (JP); Yasuo Masaki, Osaka (JP)

(73) Assignees: The University of Electro-Communications, Tokyo (JP); Funai Electric Co., Ltd., Osaka (JP)

( * ) Notice: Subject to any disclaimer, the term of this patent is extended or adjusted under 35 U.S.C. 154(b) by 931 days.

(21) Appl. No.: 12/391,754

(22) Filed: Feb. 24, 2009

(65) Prior Publication Data

US 2010/0046633 A1 Feb. 25, 2010

(30) Foreign Application Priority Data

Aug. 25, 2008 (JP) .................................. 2008-215251
Jan. 28, 2009 (JP) .................................. 2009-016233

(51) Int. Cl.
*H04N 11/02* (2006.01)

(52) U.S. Cl.
USPC .................................................. 375/240.25

(58) Field of Classification Search
USPC .................................. 375/240–241; 725/114
See application file for complete search history.

(56) References Cited

U.S. PATENT DOCUMENTS

| 6,434,195 | B1 * | 8/2002 | Luthra et al. ............. 375/240.12 |
| 2002/0048043 | A1 | 4/2002 | Takahashi et al. |
| 2002/0118952 | A1 | 8/2002 | Nakajima et al. |
| 2003/0171991 | A1 * | 9/2003 | Robbins ........................ 705/14 |
| 2005/0108774 | A1 * | 5/2005 | Sugimoto et al. ............. 725/134 |
| 2007/0150919 | A1 * | 6/2007 | Morishita ....................... 725/35 |
| 2007/0192792 | A1 * | 8/2007 | Nagamatsu .................... 725/39 |
| 2008/0271069 | A1 * | 10/2008 | Kim et al. ..................... 725/32 |
| 2009/0144797 | A1 * | 6/2009 | Wang et al. ................... 725/131 |

FOREIGN PATENT DOCUMENTS

| JP | 2002077870 A | 3/2002 |
| JP | 2002112158 A | 4/2002 |
| JP | 2002262238 A | 9/2002 |
| JP | 2003-46984 | 2/2003 |
| JP | 2003-288290 | 10/2003 |
| JP | 2005-184472 | 7/2005 |
| JP | 2005277847 A | 10/2005 |
| JP | 2007208330 A | 8/2007 |

* cited by examiner

*Primary Examiner* — Ricky Ngo
*Assistant Examiner* — Wei-Po Kao
(74) *Attorney, Agent, or Firm* — Osha Liang LLP

(57) ABSTRACT

A communication terminal, includes: a communicator, configured to transmit and receive data to and from a server storing video contents; an accumulator, configured to accumulate a plurality of partial streams extracted from different time positions within the video contents received through the communicator as asynchronous streams; a decoder, configured to decode at least one of the asynchronous streams and synchronous streams that are not extracted as the asynchronous streams from the video contents, the synchronous streams being streaming-distributed from the server; and a controller, configured to acquire streams having time position information before and after a reproduction time position of the at least one of the asynchronous streams and the synchronous streams decoded by the decoder while the at least one of the asynchronous streams and the synchronous streams are reproduced on the display, and control the display to display the acquired streams after the reproduction.

9 Claims, 23 Drawing Sheets

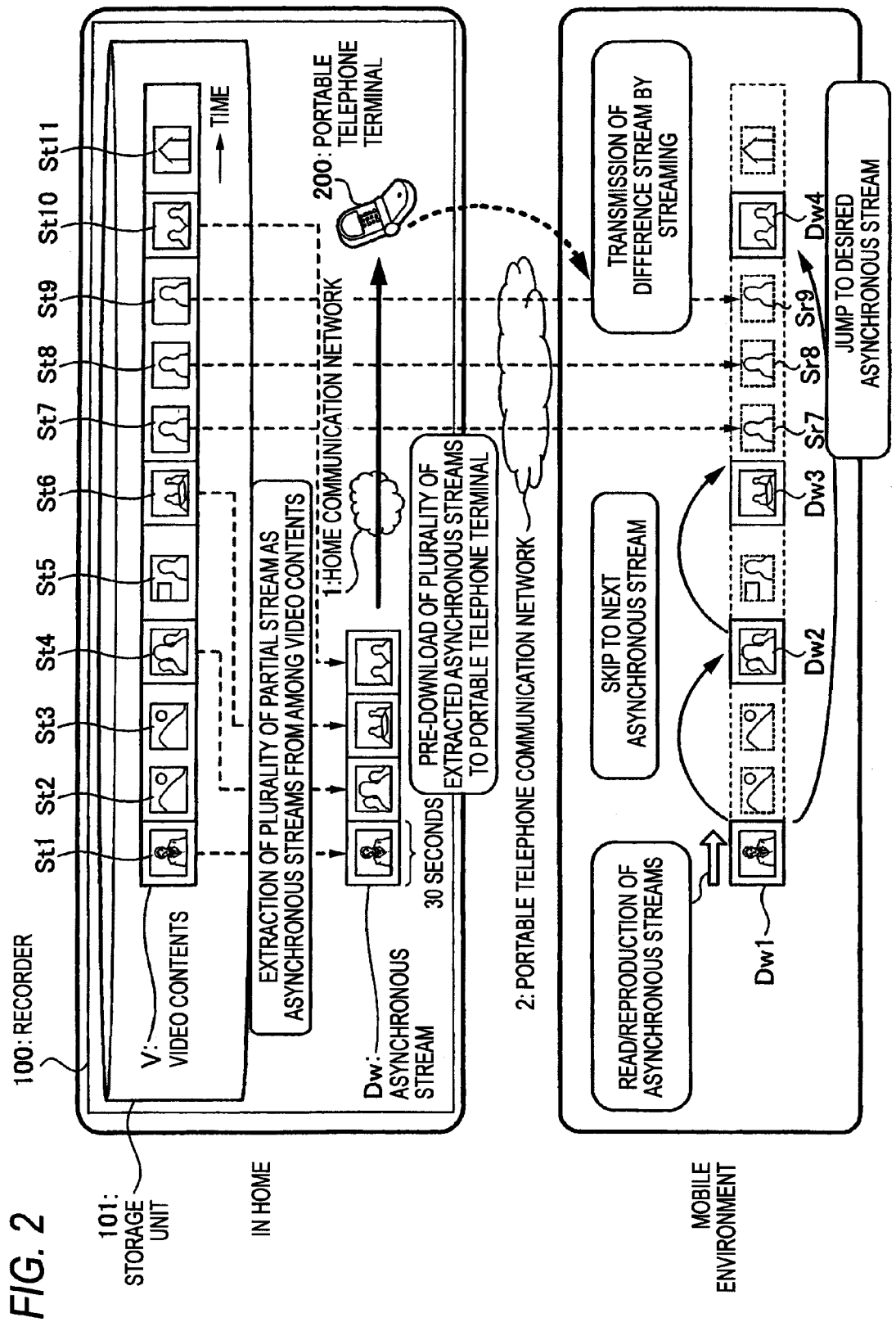

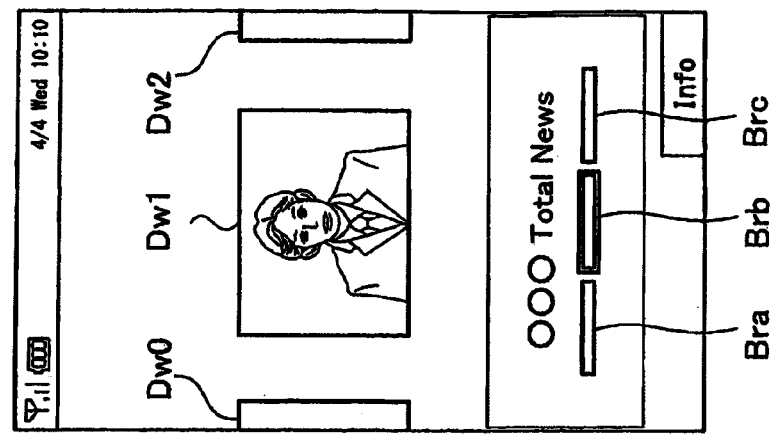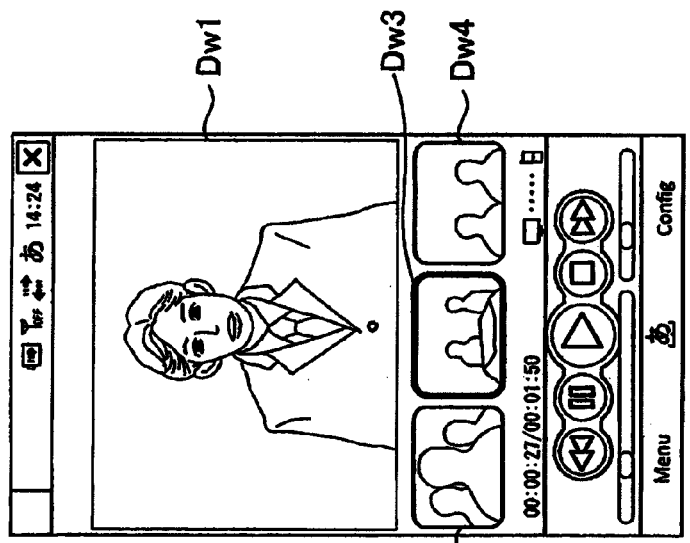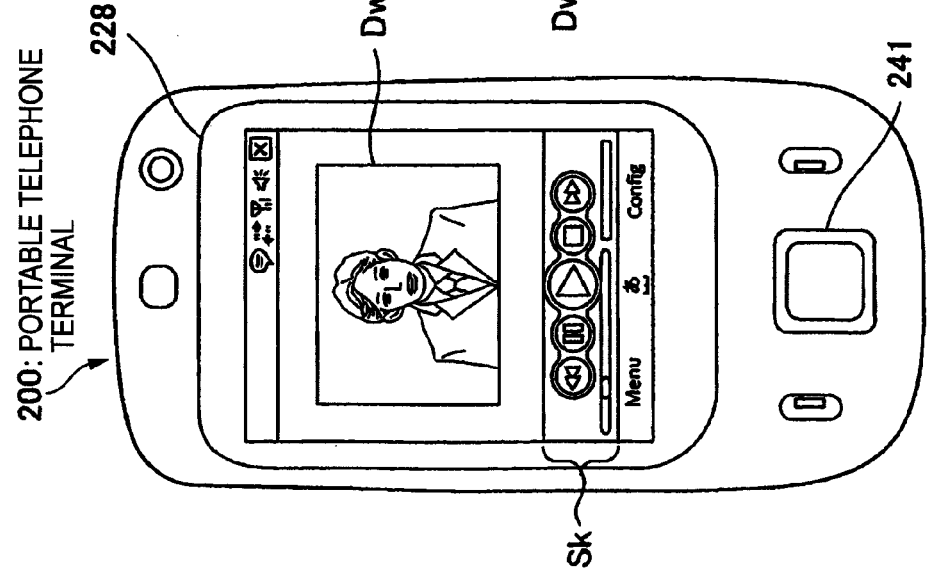

FIG. 7

```
<channel>
<title> Skim@ Scenario File </title>
<item><id> 123 </id><title> NEWS 24 </title>
<playlist>
<content type="video/mp4" layer="0" begin="0" dur="300">
rtsp://192.168.10.5:554/Full.mp4
<sub_content layer="1" offset="000" begin="0" dur="20"> http://192.168.10.5:80/sub01.mp4 </sub_content>
<sub_content layer="1" offset="050" begin="0" dur="10"> http://192.168.10.5:80/sub02.mp4 </sub_content>
<sub_content layer="1" offset="080" begin="0" dur="10"> http://192.168.10.5:80/sub03.mp4 </sub_content>
<sub_content layer="1" offset="120" begin="0" dur="20"> http://192.168.10.5:80/sub04.mp4 </sub_content>
<sub_content layer="1" offset="150" begin="0" dur="10"> http://192.168.10.5:80/sub05.mp4 </sub_content>
<sub_content layer="1" offset="180" begin="0" dur="10"> http://192.168.10.5:80/sub06.mp4 </sub_content>
</content>
</playlist>
</item>

<item><playlist> other item </playlist></item>
</channel>
```

```xml
<channel>
  <title> Skim@ Scenario File </title>
  <date> 200811110012 </date>
  <description>This file specifies a Skim@ scenario file.</description>
  <item>
    <id>1</id>
    <title> pleinecran </title>
    <subtitle> pleinecran News </subtitle>
    <description> pleinecran News </description>
    <playlist>
      <content type=" video/mp4" layer="0" begin="0" dur="300"> rtsp://1.1.1.1:554/Full.mp4

<sub_content layer="1" offset="000" begin="0" dur="20"> http://1.1.1.1:80/sub01.mp4 </sub_content>]  ←Dw1
        <sub_content layer="2" offset="050" begin="0" dur="10"> http://1.1.1.1:80/sub02.mp4 </sub_content>]  ←Dw2
        <sub_content layer="2" offset="080" begin="0" dur="10"> http://1.1.1.1:80/sub03.mp4 </sub_content>]  ←Dw3

<sub_content layer="1" offset="120" begin="0" dur="20"> http://1.1.1.1:80/sub04.mp4 </sub_content>]  ←Dw4
        <sub_content layer="2" offset="150" begin="0" dur="10"> http://1.1.1.1:80/sub05.mp4 </sub_content>]  ←Dw5
        <sub_content layer="2" offset="180" begin="0" dur="10"> http://1.1.1.1:80/sub06.mp4 </sub_content>]  ←Dw6
        <sub_content layer="2" offset="200" begin="0" dur="20"> http://1.1.1.1:80/sub07.mp4 </sub_content>]  ←Dw7
        <sub_content layer="2" offset="220" begin="0" dur="10"> http://1.1.1.1:80/sub08.mp4 </sub_content>]  ←Dw8

<sub_content layer="1" offset="240" begin="0" dur="20"> http://1.1.1.1:80/sub09.mp4 </sub_content>]  ←Dw9
        <sub_content layer="2" offset="280" begin="0" dur="10"> http://1.1.1.1:80/sub10.mp4 </sub_content>]  ←Dw10

</content>
    </playlist>
    <duration> 31:31 </duration>
    <keywords>News_Spot</keywords>
  </item>
  <item>....  </item>
  <item>....  </item>
</channel>
```

FIG. 13

COMMUNICATION TERMINAL, CONTENT REPRODUCTION METHOD, CONTENT REPRODUCTION PROGRAM, AND CONTENT REPRODUCTION SYSTEM FOR DISTRIBUTING AND REPRODUCING VIDEO CONTENTS WITH REDUCED STRESS

BACKGROUND

1. Field of the Invention

The present invention relates to a communication terminal, content reproduction method, program, content reproduction system, and server, and, more particularly, to a technology for distributing and reproducing video contents.

2. Description of the Related Art

According to high speed and large capacity of a recent mobile NW (network) and high capacity of an HDD (Hard Disc Drive) recorder in a home, a service in which video contents automatically recorded on the basis of a keyword, preference information, etc. can be viewed anytime and anywhere is being realized. Video content viewing environments through a mobile NW such as viewing using Podcast (registered trademark) and viewing using PSP (PlayStation Portable: registered trademark) and a portable player equipped with an HDD are being developed. When a video content viewing form through the mobile NW is assumed, it is considered that video viewing is realized by a streaming scheme or a download scheme.

For example, in JP-A-2005-184472, it is described that a part of contents is pre-distributed to a portable terminal and the portable terminal requests a server to provide the remaining part of the contents when the contents are reproduced.

In JP-A-2003-046984, it is described that a user terminal receives and reproduces a part of program contents in an individual channel, receives and accumulates program contents when a program from a specified broadcast channel is broadcasted, and reproduces the accumulated broadcast channel program after information of an individual channel is completely reproduced. Also, it is described that an operation for dividing into a plurality of segments with the same data size in sequence from the head, assigning numbers thereto, streaming-reproducing data distributed on an individual channel, downloading segments of one period broadcasted on the broadcast channel in a segment unit in the user terminal, and reproducing segments downloaded during segment reproduction in a number sequence immediately after the segment reproduction ends is repeated until the reproduction of all program contents ends.

In JP-A-2003-288290, it is described that a content distribution server sends an internal reproduction list to a user terminal, first sends a divided file to be first viewed by a client application to a receiver, and sequentially sends other divided files thereafter.

However, in the conventional technology, it is difficult to realize stable video view with little stress in a content browsing operation, an operation of a playback device, etc. according to a decrease of a transmission rate and an increase of a delay time due to a wireless situation varying dynamically. On the other hand, it is assumed that all video contents are pre-accumulated in a mobile terminal by a content download using a USB (Universal Serial Bus), a near field wireless link, etc., or a content download of a midnight time period using a mobile NW. However, it is hard to say that this is a practical method when considering diversification and large capacity of contents in the future.

In Patent Documents 1 to 3 described above, a configuration for distributing a part of contents and then distributing the remaining part of the contents is described, but stable content viewing with little stress cannot be realized, such as the fact that the distribution of each divided part of the contents cannot be skipped.

SUMMARY

It is therefore one advantageous aspect of the invention to realize stable content viewing with little stress in video content distribution via a network.

According to an aspect of the invention, there is provided a communication terminal, including: a communicator, configured to transmit and receive data to and from a server storing video contents; an accumulator, configured to accumulate a plurality of partial streams extracted from different time positions within the video contents received through the communicator as asynchronous streams; a decoder, configured to decode at least one of the asynchronous streams and synchronous streams that are not extracted as the asynchronous streams from the video contents, the synchronous streams being streaming-distributed from the server; and a controller, configured to acquire streams having time position information before and after a reproduction time position of the at least one of the asynchronous streams and the synchronous streams decoded by the decoder while the at least one of the asynchronous streams and the synchronous streams are reproduced on the display, and control the display to display the acquired streams after the reproduction.

According to another aspect of the invention, there is provided a content reproduction method, including: accumulating a plurality of partial streams extracted from different time positions within video contents received from a server as asynchronous streams; decoding at least one of the asynchronous streams and synchronous streams that are not extracted as the asynchronous streams from the video contents, the synchronous streams being streaming-distributed from the server; acquiring streams having time position information before and after a reproduction time position of the at least one of the asynchronous streams and the synchronous streams while the at least one of the asynchronous streams and the synchronous streams are reproduced on a display; and controlling the display to display the acquired streams after the reproduction. Further, according to still another aspect of the invention, there is provided a computer program product storing a computer program configured to causing a computer to execute the above-mentioned method.

According to still another aspect of the invention, there is provided a content reproduction system including: a server and a communication terminal. The server includes: a storage, configured to accumulate video contents; a first generator, configured to extract a plurality of partial streams from different time positions within the video contents accumulated in the storage and generates a plurality of asynchronous streams; and a first communicator, configured to transmit at least one of the asynchronous streams generated by the first generator and synchronous streams that are not extracted as the asynchronous streams from the video contents. The communication terminal includes: a second communicator, configured to transmit and receive data to and from the server; an accumulator, configured to accumulate the asynchronous streams received through the second communicator; a decoder, configured to decode the at least one of the asynchronous streams and the synchronous streams transmitted from the server; and a controller, configured to acquire streams having time position information before and after a reproduction time position of the at least one of the asynchronous streams and the synchronous streams decoded by the decoder while the at least one of the asynchronous streams and the synchronous streams are reproduced on the display, and control the display to display the acquired streams after the reproduction.

According to the above aspect, a plurality of asynchronous or synchronous streams extracted from different time positions within video contents are reproduced on the display. On the basis of a command from a user input through an input unit, a type of asynchronous streams to be reproduced on the display is changed. On this basis, the asynchronous or synchronous streams having time position information before and after a reproduction time position are acquired and reproduced according to a reproduction time position in a reproduction image varying on the basis of the above-described command.

According to the above aspect, zapping reception of video contents using a plurality of acquired asynchronous streams is possible. Even when an operation for changing a type of asynchronous streams is input by a user, accumulated asynchronous streams are used and a connection to synchronous streams over a network is not performed. Thereby, stable content viewing by the user can be realized with little stress.

According to the above aspect, asynchronous or synchronous streams having time position information before and after a reproduction time position are acquired during stream reproduction, that is, during viewing. By taking a stream being viewed by the user as the starting point, streams existing thereafter are acquired. That is, the user can select a preference scene and view it subsequent to a scene that lies ahead.

BRIEF DESCRIPTION OF THE DRAWINGS

Embodiment may be described in detail with reference to the accompanying drawings, in which:

FIG. 2 is an illustrative view showing an outline of the system according to the first embodiment of the present invention;

FIGS. 4A to 4C are illustrative views showing a display example of asynchronous streams according to the first embodiment of the present invention;

FIG. 7 is an illustrative view showing a description example of a scenario file according to the first embodiment of the present invention;

FIG. 13 is an illustrative view showing a description example of a scenario file according to a second modified example of the first embodiment of the present invention;

DETAILED DESCRIPTION OF THE INVENTION

In a first embodiment, a server of the present invention is applied to a hard disc recorder (hereinafter, simply referred to as recorder) having an automatic program recording function and a communication terminal of the present invention is applied to a portable telephone terminal. In this example, the recorder is based on a real-time distribution protocol, for example, such as RTSP (Real-Time Streaming Protocol) or etc. Content data accumulated within the recorder is encoded by an MPEG-4 SP, H.263, or H.264 video encoding scheme, an MPEG-4 AAC audio encoding scheme, etc. In this embodiment, a plurality of partial streams extracted from different time positions within program (video) contents are generated/accumulated in advance in the recorder and downloaded to a portable telephone terminal before a program is viewed.

Figure 1:
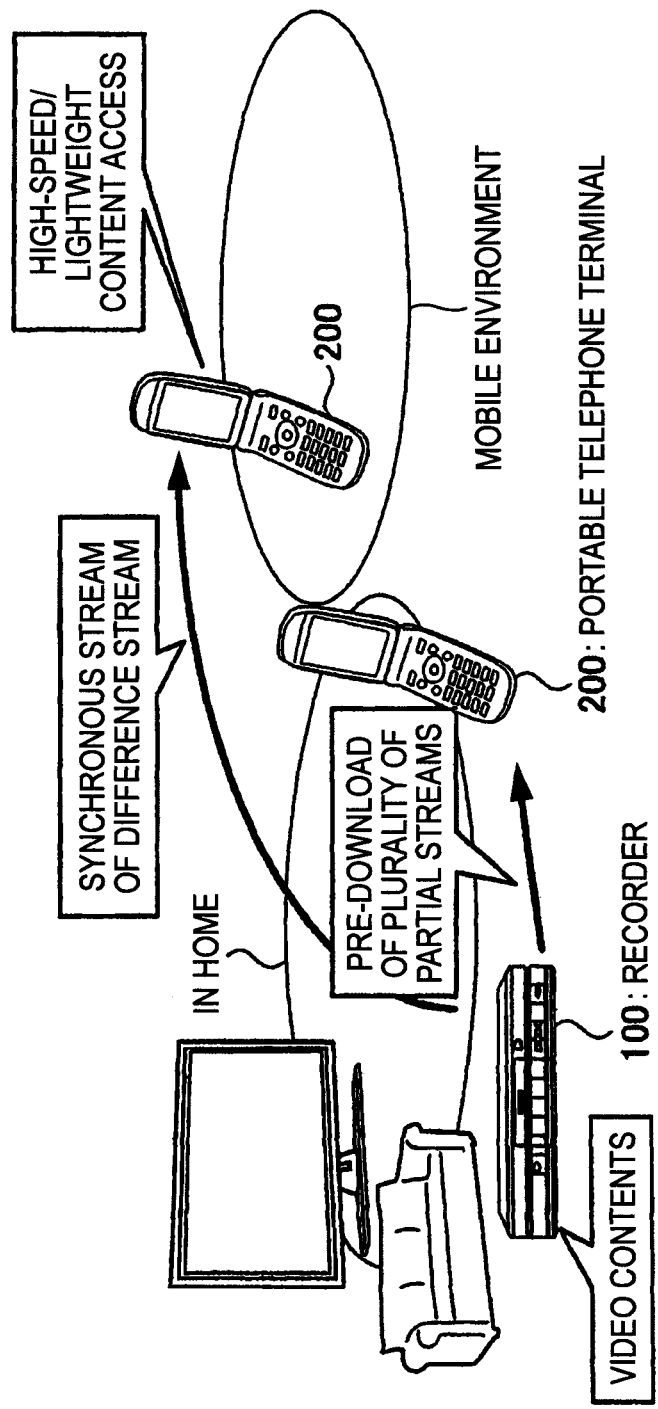
FIG. 1 is a schematic view showing a configuration example of a system according to a first embodiment of the present invention.

FIG. 1 is a view illustrating a system outline. A space in a home is shown on the left side of FIG. 1 and a mobile environment capable of using a portable telephone communication network in a school, a company, an electric train, or etc. is shown on the right side. A recorder 100 recording a plurality of video contents is provided in a home and has a function for automatically generating and accumulating a plurality of partial streams within each video content in a device at timing upon recording or etc. The partial streams are generated according to the format of MP4 or etc.

The plurality of partial streams accumulated within the recorder 100 are transmitted to a portable telephone terminal 200 at timing while sleeping of the user before an outing, etc. That is, in this case, the partial streams are acquired by the portable telephone terminal 200 at (asynchronous) timing different from a reproduction time of original video contents. In the following description, the partial streams pre-accumulated within the portable telephone terminal 200 in the above-described form are referred to as asynchronous streams.

In the mobile environment, the plurality of pre-accumulated asynchronous streams are reproduced on the portable telephone terminal 200 on the basis of an operation by the user. Then, the user selects an arbitrary asynchronous stream from among the reproduced asynchronous streams. That is, the user selects a preference scene (reproduction position) to be continuously viewed by viewing various asynchronous streams in a zapping manner. After a reproduction position desired for viewing is determined, a difference stream (hereinafter, referred to as synchronous stream), which is not accumulated in the portable telephone terminal 200, is transmitted through the portable telephone communication network 2 of FIG. 2 from the recorder 100 in the home. Thereby, the user can view video contents desired for viewing from a favorite scene.

FIG. 1 shows an example in which a download of asynchronous streams is performed in the home, but is not limited thereto. For example, the download may be performed in other places of a shop, etc.

Next, a relation of asynchronous and synchronous streams will be described with reference to FIG. 2. In FIG. 2, the same reference numerals are assigned to parts corresponding to FIG. 1. In FIG. 2, the upper stage shows a space in the home and the lower stage shows a mobile environment. The recorder 100 located in the home has a storage unit 101 in which video contents V are recorded.

In the example shown in FIG. 2, the video contents V are configured by streams of a stream St1 to a stream St10. Among the streams, four streams of the streams St4, St6, St9, and St10 are accumulated as asynchronous streams Dw1 to Dw4 in the storage unit 101. The asynchronous streams Dw1 to Dw4 have a regular time length of, for example, 30 seconds or etc., respectively. In the following description, when the asynchronous streams Dw1 to Dw4 do not need to be individually divided and described, they are simply described as asynchronous streams Dw.

A time position and time length of each asynchronous stream Dw can be fixedly set to predetermined values and changed according to content of the video contents V. For example, when they are fixedly set, the video contents V are extracted as asynchronous streams for 1 minute every 5 minutes. When the time position and time length of each asynchronous stream Dw are determined according to content of the video contents V, for example, 1 minute every 4 minutes is set in a music program, 1 minute every 2 to 3 minutes is set in news, and 1 to 5 minutes every 5 to 10 minutes are set in a drama.

The user selects video contents V desired for viewing in a mobile environment of an outing destination at timing before an outing and pre-downloads the asynchronous streams Dw1 to Dw4 generated from the video contents V to the portable telephone terminal 200 through a home communication network 1. Here, the home communication network 1 indicates near field wireless communication of IEEE 802.11x, Bluetooth (registered trademark), etc., or communication using a wired USB cable, etc.

Figure 3A:
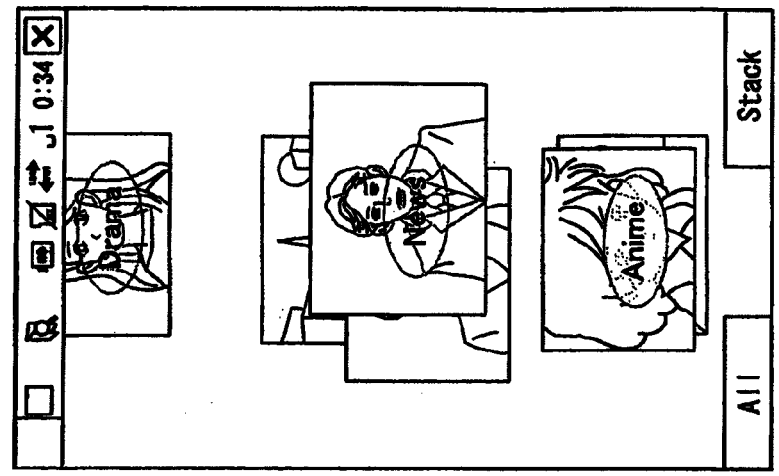
FIGS. 3A to 3C are illustrative views showing a configuration example of a video content selection screen according to the first embodiment of the present invention.
Figure 3B:
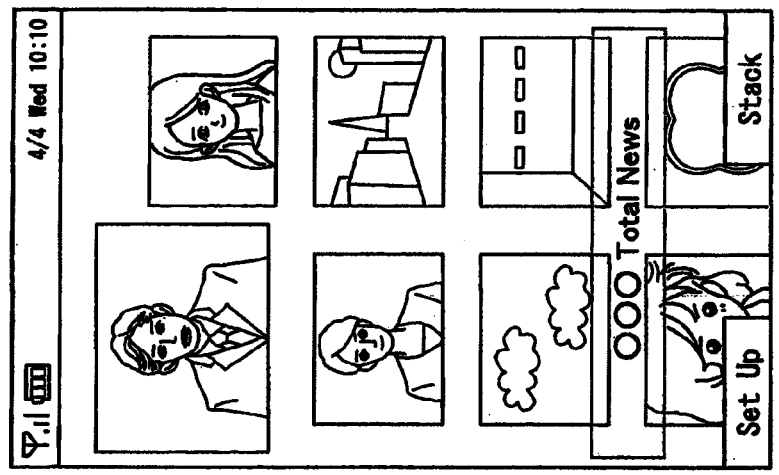
Figure 3C:
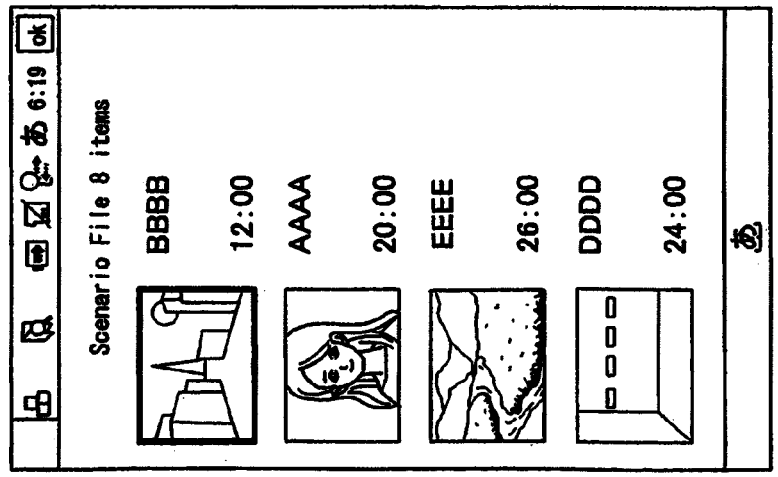

Target video contents V for downloading the asynchronous streams Dw, that is, video contents V desired for viewing, are selected through a user interface (hereinafter, referred to as UI) as shown in FIGS. 3A to 3C. In FIG. 3A, various types of video contents V are thumbnail-displayed on the left side of the screen and attribute information of a title, reproduction time information, etc. of each video content V is displayed on the right side of each thumbnail display area.

In the example shown in FIG. 3B, a thumbnail display area of 2 columns in the horizontal direction and 4 rows in the vertical direction is arranged on the screen and only attribute information about the video contents V selected by the user is displayed as indicated by "OOO Total News".

In the example shown in FIG. 3C, a plurality of thumbnail images are stacked and displayed in each category of video contents V of "News", "Drama", or etc. Through the above-described UI, the user selects video contents V desired for viewing.

The description is continued by returning to FIG. 2. In the mobile environment, the user first reads and reproduces the asynchronous stream Dw1 accumulated in the portable telephone terminal 200. Then, when the next asynchronous stream Dw2 of the read asynchronous stream Dw1 is skip-displayed, the user searches for a scene to be viewed by performing an operation for jumping to the asynchronous stream Dw4 that lies ahead.

As described above, the portable telephone terminal 200 reproduces streams at any time from a reproduction time position selected by the user while the user performs a skip or jump operation. When an asynchronous stream Dw to be read does not exist within the portable telephone terminal 200 on reproduction timing, a stream to exist at its reproduction position is read from the recorder 100 in the home. Then, a read difference stream (synchronous stream) is transmitted (streaming) to the portable telephone terminal 200 through the portable telephone communication network 2.

Next, a screen display example of the asynchronous stream Dw1 in the portable telephone terminal 200 will be described with reference to FIG. 4. The portable telephone terminal 200 shown in FIG. 4 has a display unit 228 including a liquid crystal panel, etc. and an operation input unit 241 including buttons, etc. On a screen of the display unit 228 of the portable telephone terminal 200 shown in FIG. 4A, the asynchronous stream Dw1 is displayed and soft keys Sk including a play button and fast-forward/rewind buttons are displayed therebelow. The user can reproduce an asynchronous stream corresponding to a future time position than a reproduction time while skipping to the next by operating the buttons or soft keys Sk.

As shown in FIG. 4B, when the asynchronous streams Dw are list-displayed on the lower side of the display unit 228, a jump operation to an arbitrary time position can be also performed. In the portable telephone terminal 200 shown in FIG. 4B, the asynchronous stream Dw1 is reproduced on a screen of the display unit 228 and simultaneously the asynchronous streams Dw2, Dw3, and Dw4 are displayed as a list therebelow. According to this display form, the user can also read images of other scenes on a list while viewing a specific scene of the video contents V. A fast jump operation to a selected scene can be performed by selecting an arbitrary scene on the list.

In an image list display operation of other scenes, bars can be also displayed as shown in FIG. 4C without displaying images as shown in FIG. 4B. On the screen shown in FIG. 4C, the asynchronous stream Dw1 is displayed and images of end portions of the asynchronous streams Dw0 and Dw2 temporally neighboring the time position of the asynchronous stream Dw1 are displayed on the right and left sides thereof. Bars Br are arranged by corresponding to their display positions and bars Bra, Brb, and Brc are arranged in sequence from the left of the screen. The user can jump to an arbitrary time position different from a reproduction time position of a scene currently being viewed by selecting an arbitrary one from among these bars Br.

Figure 5:
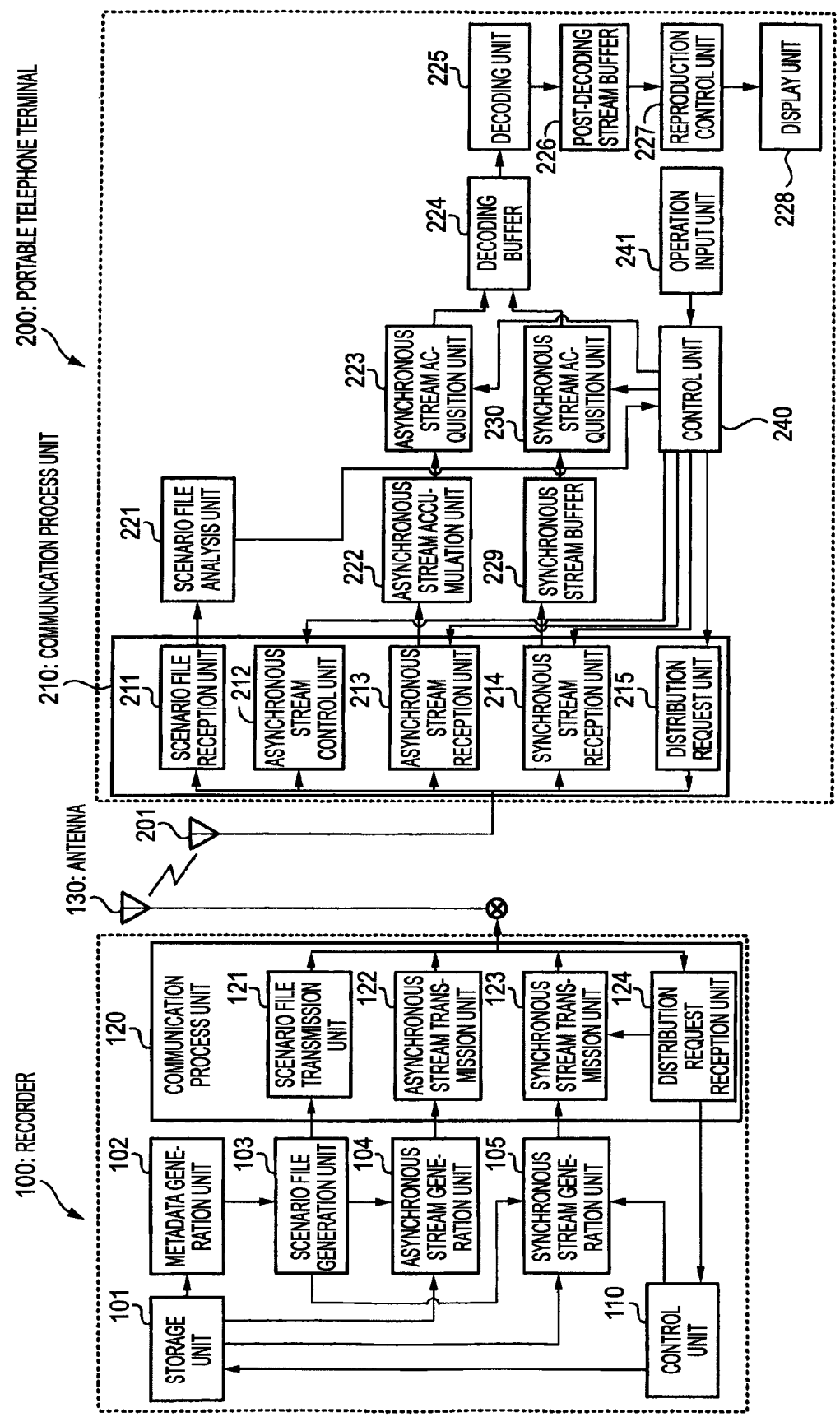
FIG. 5 is a block diagram showing an internal configuration example of the system according to the first embodiment of the present invention.

Next, an internal configuration example of the system according to this embodiment will be described with reference to FIG. 5. FIG. 5 is a block diagram showing internal configurations of the recorder 100 and the portable telephone terminal 200 shown in FIGS. 1 and 2. First, the configuration of the recorder 100 will be described. The recorder 100 has a storage unit 101 for storing video contents V, a metadata generation unit 102 for generating attribute information about the video contents V, a scenario file generation unit 103, and an asynchronous stream generation unit 104.

The scenario file generation unit 103 determines each time position of a plurality of asynchronous streams Dw on the basis of metadata generated by the metadata generation unit 102. Then, the determined time position information of each asynchronous stream Dw is described as scenario data in a scenario file. The scenario file generation unit 103 transmits the generated scenario file to the asynchronous stream generation unit 104, a synchronous stream generation unit 105, and a scenario file transmission unit 121 within a communication process unit 120. The scenario file transmission unit 121 transmits the scenario file supplied from the scenario file generation unit 103 to the portable telephone terminal 200 through an antenna 130.

On the basis of content described in the scenario file supplied from the scenario file generation unit 103, the asynchronous stream generation unit 104 partially acquires the video contents V from the storage unit 101 and generates and accumulates the plurality of asynchronous streams Dw. Then, at timing when a distribution request of the asynchronous streams Dw from the portable telephone terminal 200 is transmitted, the accumulated asynchronous streams Dw are output to the asynchronous stream generation unit 104 within the communication process unit 120.

On the basis of control by a control unit 110 for controlling each part within the recorder 110 an asynchronous stream transmission unit 122 transmits the asynchronous streams Dw supplied from the asynchronous stream generation unit 104 to the portable telephone terminal 200 through the antenna 130.

The communication process unit 120 further includes a distribution request reception unit 124 for receiving a distribution request transmitted from the portable telephone terminal 200 and supplying the received distribution request to the control unit 110. When the distribution request is input from the distribution request reception unit 124, the control unit 110 generates a control signal for commanding to generate a synchronous stream on the basis of time information included in the distribution request (information indicating a position within an original stream). When the time information within the original stream is, for example, offset "000", begin="0", and dur="20" in the seventh item from the top of FIG. 7, the transmission request having a description in which the next synchronous stream starts from "20" in the total duration is transmitted from the portable telephone terminal 200. The control unit 110 supplies a control signal generated on the basis of the above-described distribution request to the synchronous stream generation unit 105.

The synchronous stream generation unit 105 reads a difference stream, which is not extracted as an asynchronous stream, from the storage unit 101 on the basis of content described in the scenario file supplied from the scenario file generation unit 103 and a control signal supplied from the control unit 110. Then, the read difference stream is output as a synchronous stream to the synchronous stream transmission unit 123. The synchronous stream transmission unit 123 transmits the synchronous stream to the portable telephone terminal 200 through the antenna 130. In this example, the synchronous stream is configured to be generated whenever the request is received, but may be generated/accumulated in advance.

Next, similarly, the internal configuration of the portable telephone terminal 200 will be described with reference to FIG. 5. The portable telephone terminal 200 has a communication process unit 210 to transmit and receive data to and from the recorder 100, wherein the communication process unit 210 includes a scenario file reception unit 211, an asynchronous stream control unit 212, an asynchronous stream reception unit 213, a synchronous stream reception unit 214, and a distribution request unit 215.

The scenario file reception unit 211 receives a scenario file transmitted from the recorder 100 and supplies the received scenario file to a scenario file analysis unit 221. The scenario file analysis unit 221 analyzes the input scenario file and supplies an analysis result to a control unit 240.

On the basis of the analysis result, the control unit 240 performs a control operation for acquiring an asynchronous stream Dw from the recorder 100 and accumulating the asynchronous stream Dw in an asynchronous stream accumulation unit 222 to be described later. The control unit 240 performs a control operation for acquiring a synchronous stream from the recorder 100 and outputting the synchronous stream to a synchronous stream buffer 229 to be described later. To acquire the asynchronous or synchronous stream, a session for receiving the streams needs to be initiated with the recorder 100. In the following description, a session for acquiring the synchronous stream is referred to as a "synchronous stream session", and a session for acquiring the asynchronous stream Dw is referred to as an "asynchronous stream session".

The control unit 240 commands the asynchronous stream control unit 212 to acquire the asynchronous stream Dw when the asynchronous stream session is initiated, and commands the distribution request unit 215 to acquire the synchronous stream when the synchronous stream session is initiated. At this time, the control unit 240 flexibly controls start timing of the synchronous stream session according to a situation of the portable telephone communication network 2. A control process of the start timing of the synchronous stream session will be described later.

When an acquisition start command of the asynchronous stream Dw is input from the control unit 240, the asynchronous stream control unit 212 generates a transmission command of the asynchronous steam Dw to the recorder 100 and transmits the command to the recorder 100 through an antenna 201.

Figure 6:
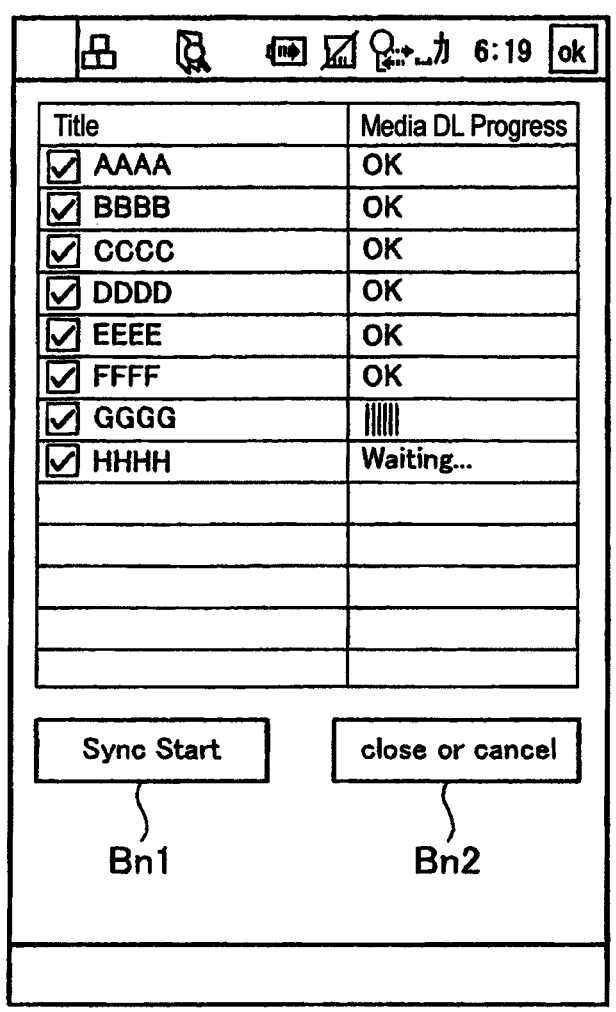
FIG. 6 is an illustrative view showing a screen configuration example upon asynchronous stream acquisition according to the first embodiment of the present invention.

In this example, the acquisition command of the asynchronous stream is performed on the basis of an operation for allowing the user to make an input through the operation input unit 241. According to the command by the user, the control unit 240 generates the acquisition start command of the asynchronous stream Dw. FIG. 6 shows a configuration example of an acquisition command screen (UI) of the asynchronous stream. In FIG. 6, a screen displayed on the display unit 228 is shown and a "Sync Start" button Bn1 and a "close or cancel" button Bn2 are arranged on the lower side of the screen. Then, on its upper side, an area indicating information of the asynchronous stream Dw received from the recorder 100 exists.

When a press of the Sync Start button Bn1 is received from the user, the control unit 240 generates the acquisition start command of the asynchronous stream Dw and reports the generated acquisition start command of the asynchronous stream Dw and time position information of the asynchronous steam Dw included in the scenario file to the asynchronous stream control unit 212. Then, the asynchronous steam Dw transmitted from the recorder 100 is input from the asynchronous stream reception unit 213. In the upper area of FIG. 6, a title and reproduction time information of the video contents V is shown as attribute information of the asynchronous stream Dw acquired as described above. The title of the video contents V is displayed like "AAAA", "BBBB", or etc. and, in the right row thereof, progressive information of acquisition (download) of the asynchronous stream Dw is displayed using "OK", "Waiting", or a progressive bar.

The description is continued by returning to FIG. 5. When the asynchronous stream Dw transmitted from the recorder 100 is received, the asynchronous stream reception unit 213 accumulates the received asynchronous stream Dw in the asynchronous stream accumulation unit 222. The asynchronous stream accumulation unit 222 retains the asynchronous stream until an asynchronous stream read command is input from an asynchronous stream acquisition unit 223 of a rear stage.

The asynchronous stream acquisition unit 223 reads the asynchronous stream Dw from the asynchronous stream accumulation unit 222. After reading the asynchronous stream Dw, the asynchronous stream acquisition unit 223 performs a process for replacing a timestamp assigned to the read asynchronous stream Dw with a uniform timestamp to be used within the portable telephone terminal 200. The assignment of the uniform timestamp is performed in a packet unit of the asynchronous stream.

The asynchronous stream acquisition unit 223 adds a flag indicating that the packet is the "asynchronous stream" to each packet of the asynchronous steam Dw to which the uniform timestamp is mapped and outputs it to a decoding buffer 224.

When the acquisition start command of the synchronous stream is received from the control unit 240, the distribution request unit 215 generates a transmission command of the synchronous stream and transmits it to the recorder 100 through the antenna 201.

When the synchronous stream transmitted from the recorder 100 is received, the synchronous stream reception unit 214 accumulates the received synchronous stream in a synchronous stream buffer 229. The synchronous stream buffer 229 retains the synchronous stream until the synchronous stream read command is input from the synchronous stream acquisition unit 230 of a rear stage.

The synchronous stream acquisition unit 230 reads a synchronous stream from the synchronous stream buffer 229 on the basis of control by the control unit 240. Then, a process for mapping the timestamp assigned to the read synchronous stream to a uniform timestamp as described above is performed. Specifically, an operation for acquiring a timestamp of a first packet after the start of each synchronous stream session and assigning a start time of the corresponding session within a scenario file as an offset value on the basis of a passage time therefrom is performed. This is because a timestamp in which absolute time information within video contents is described in the packet of the synchronous stream is not assigned.

The synchronous stream acquisition unit 230 adds a flag indicating that the packet is the "synchronous stream" to each packet of the synchronous steam to which the common timestamp is mapped and outputs it to the decoding buffer 224.

The decoding buffer 224 temporarily accumulates the asynchronous stream output from the asynchronous stream acquisition unit 223 and the synchronous stream output from the synchronous stream acquisition unit 230 (all encoding data).

A decoding unit 225 reads and decodes encoding data accumulated within the decoding buffer 224 and outputs the decoded data to a post-decoding stream buffer 226. The post-decoding stream buffer 226 temporarily retains decoding data decoded by the decoding unit 225, that is, the asynchronous stream Dw and the synchronous stream after decoding.

A reproduction control unit 227 performs a control operation for reading the asynchronous stream Dw and the synchronous stream accumulated in the post-decoding stream buffer 226 and reproducing them on the display unit 228. Specifically, using a time when each stream is extracted from the post-decoding stream butter 226, a uniform timestamp assigned to the extracted asynchronous stream Dw or the synchronous stream, and a system clock within the portable telephone terminal 200, an operation for synchronizing the reproduction start time on the display unit 228 with the system clock is performed.

The display unit 228 displays the asynchronous stream Dw or the synchronous stream synchronously controlled by the reproduction control unit 227.

Next, an example of start timing control of the synchronous stream session by the control unit 240 will be described. In a background where the above-described control is required, a difference exists between an access rate to the synchronous stream and an access rate to the asynchronous stream. In this embodiment, since the asynchronous stream is pre-accumulated within the portable telephone terminal 200, access can be performed at relatively high speed. On the other hand, since the synchronous stream is acquired through the network (portable telephone communication network 2), the access rate is lower than that to the asynchronous stream. The access rate of the synchronous stream varies according to a state of the portable telephone communication network 2.

Accordingly, when the arrival of a packet of the synchronous stream is delayed in the case of switching from the asynchronous stream to the synchronous stream, the decoding buffer 224 (see FIG. 5) is in an underflow state. In this case, since a reproduction delay occurs, the control unit 240 performs a control operation for avoiding it.

That is, a process for starting the synchronous stream session and accumulating a packet received by the synchronous stream reception unit 214 (see FIG. 5) in the synchronous stream buffer 229 is performed at timing when the remaining reproduction time of the asynchronous stream exceeds a predetermined threshold. For example, a time position before 3 seconds or etc. from a reproduction end point of the asynchronous stream is set to the "predetermined threshold". Also, the control unit 240 performs a control operation for acquiring a packet of a subsequent synchronous stream until the reproduction of the asynchronous stream ends. By performing the above-described control, switching from the asynchronous stream Dw to the synchronous stream is performed directly and seamlessly. A switching process is realized when the synchronous stream acquisition unit 230 copies a packet from the synchronous stream buffer 229 to the decoding buffer 224.

Next, a description example of a scenario file will be described with reference to FIG. 7. Information about the synchronous and asynchronous stream sessions, etc. is described in the scenario file, and the portable telephone terminal 200 acquires the asynchronous stream Dw and the synchronous stream based on the information. Specifically, an address of the recorder 100, a file path, a port number, and a stream's inner time are described in the synchronous stream session information and the asynchronous stream session information. Also, information of reproduction timing between a plurality of sessions including the synchronous stream session and the asynchronous stream session, etc. are described in the scenario file.

In the scenario file shown in FIG. 7, a reproduction sequence of the video contents V and its reproduction timing information are described according to a <content> tag within a <playlist> tag. According to a <sub_content> tag, information of the asynchronous stream session within a synchronous stream session time interval indicated by the <content> tag is described. Specifically, according to attribute information written as "offset", an offset value of a reproduction time within the synchronous stream session is expressed. According to attribute information written as "dur", a time length of each asynchronous stream Dw is expressed. A layer attribute written as "layer" expresses a layer relation in each asynchronous stream file, but a process using a scenario file having a layer structure will be described later.

Figure 8:
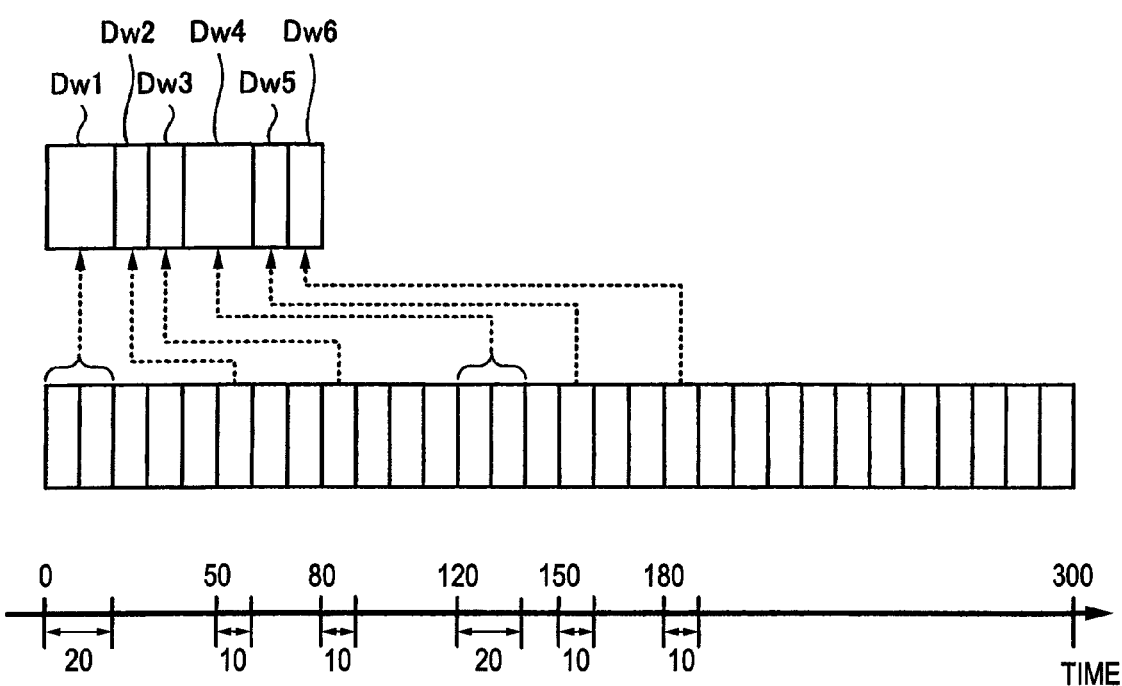
FIG. 8 is an illustrative view showing a configuration example of asynchronous streams according to the first embodiment of the present invention.

FIG. 8 is an illustrative view showing an example in which asynchronous streams is generated on the basis of the scenario file shown in FIG. 7. The asynchronous streams Dw are shown on the upper stage of FIG. 8 and streams of video contents V serving as the original of the asynchronous streams Dw are shown on the lower stage. The horizontal axis of FIG. 8 represents the time. According to the description of the scenario file shown in FIG. 7, it is found that the video contents V shown on the lower stage are stored in "rtsp:// 192.168.10.5" and the file has a name of "Full.mp4".

The asynchronous streams Dw shown on the upper stage is generated from the video contents v shown on the lower stage according to the description of the scenario file shown in FIG. 7. The asynchronous streams Dw include a file Dw1 having a time length of 20 seconds by taking a point of "0" of a reproduction time within the video contents V as the starting point, a file Dw2 having a time length of 10 seconds by taking a point of "50" as the starting point, and a file Dw3 having a time length of 10 seconds by taking a point of "80" as the starting point. They further include a file Dw4 having a time length of 20 seconds by taking a point of "120" as the starting point, a file Dw5 having a time length of 10 seconds by taking a point of "150" as the starting point, and a file Dw6 having a time length of 10 seconds by taking a point of "180" as the starting point.

For example, the file Dw1 is generated on the basis of the following description in the scenario file shown in FIG. 7.

<sub_content layer="1" offset="000" begin="0" dur="20"> http://192.168.10.5:80/sub01.mp4</sub_content>

That is, a file in which an offset value (offset) of the reproduction time within the video contents V is "000", a time length (dur) is "20", and a file name is "sub01.mp4" is generated as the asynchronous stream file Dw1.

A new timestamp different from that of the original video contents v is assigned to the generated asynchronous stream Dw. When a plurality of asynchronous streams are generated as one file, a timestamp of 0 to 20 is assigned to the file Dw1, a timestamp of 20 to 30 is assigned to the file Dw2, a timestamp of 30 to 40 is assigned to the file Dw3, a timestamp of 40 to 60 is assigned to the file Dw4, a timestamp of 60 to 70 is assigned to the file Dw5, and a timestamp of 70 to 80 is assigned to the file Dw6 as shown in FIG. 8. When the plurality of asynchronous streams are generated as different files, a timestamp of 0 to 20 is assigned to the file Dw1, a timestamp of 0 to 20 is assigned to the file Dw2, a timestamp of 0 to 20 is assigned to the file Dw3, a timestamp of 0 to 20 is assigned to the file Dw4, a timestamp of 0 to 20 is assigned to the file Dw5, and a timestamp of 0 to 20 is assigned to the file Dw6. That is, the asynchronous stream Dw to which a timestamp different from that of the above-described original video contents V is assigned is input to the asynchronous stream reception unit 213 (see FIG. 5).

Figure 9:
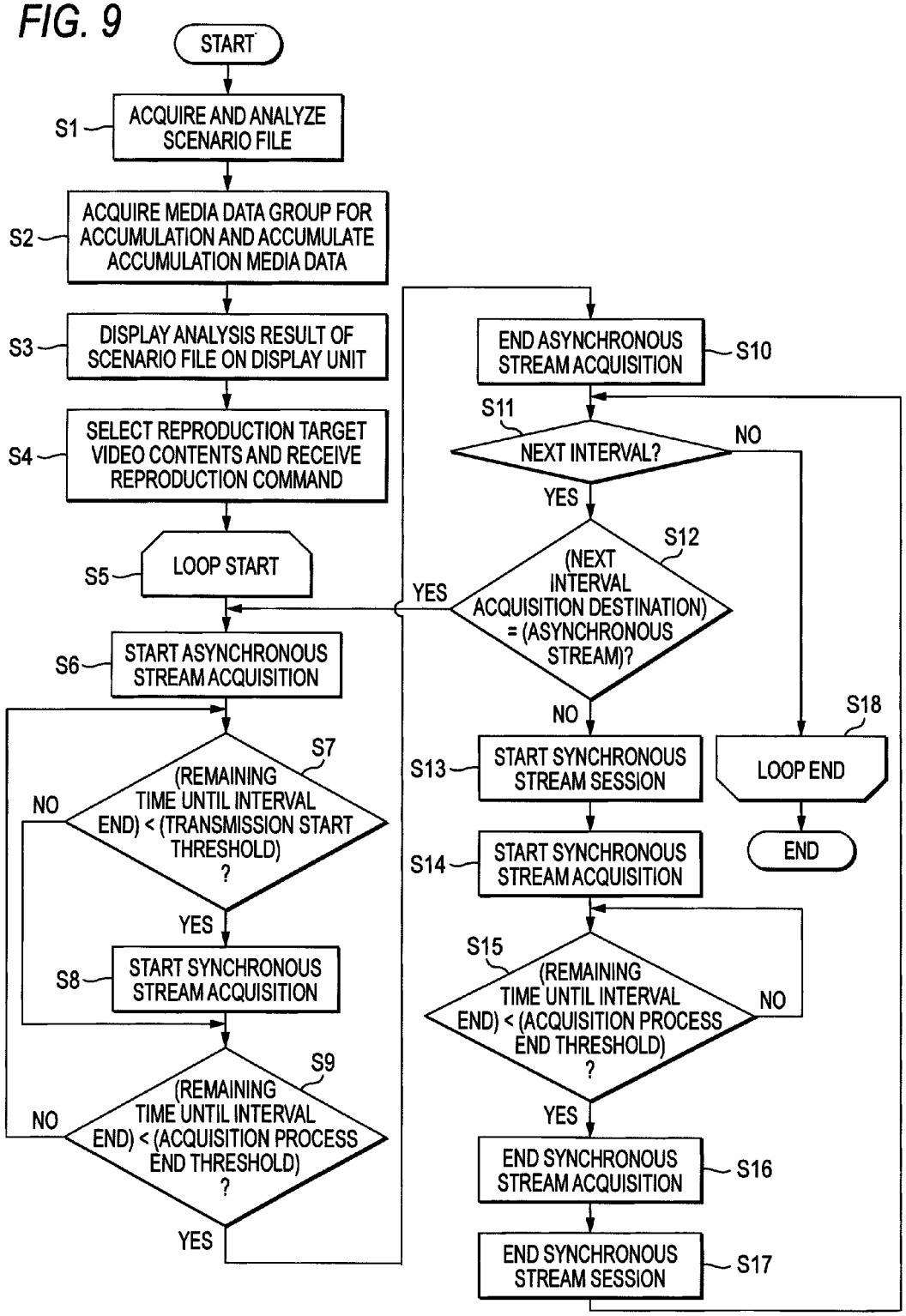
FIG. 9 is a flowchart showing an example of an asynchronous stream acquisition process according to the first embodiment of the present invention.

Next, an example of an acquisition process of asynchronous and synchronous streams in the portable telephone terminal 200 will be described with reference to the flowchart of FIG. 9. FIG. 9 is a flowchart showing an acquisition process of an asynchronous stream Dw. In FIG. 9, first, a scenario file received from the recorder 100 is received by the scenario file reception unit 211 (see FIG. 5) and analyzed by the scenario file analysis unit 221 (step S1).

Then, under control performed by the control unit 240 on the basis of an analysis result of the scenario file, an asynchronous stream is received by the asynchronous stream reception unit 213 and the received asynchronous stream is accumulated in the asynchronous stream accumulation unit 222 (step S2). Next, information of a name (title) and a reproduction time of each content (asynchronous stream) obtained as the analysis result of the scenario file is displayed on the display unit 228 (see FIG. 5) (step S3).

When an operation for selecting video contents V to be viewed by the user and reproducing the selected video contents V is performed on the basis of the information displayed on the display unit 228 (step S4), a "loop" is started (step S5). Then, in the loop, first, the acquisition of the asynchronous stream Dw is started (step S6). That is, the asynchronous stream Dw accumulated in the asynchronous stream accumulation unit 222 is read by the asynchronous stream acquisition unit 223. The read asynchronous stream Dw accumulated in the decoding buffer 224 is decoded by the decoding unit 225 and reproduced on the display unit 228 on the basis of control by the reproduction control unit 227.

Next, the next interval is a synchronous stream and it is determined whether or not the remaining time until the end of a reproduction interval (hereinafter, simply referred to as interval) of the asynchronous stream Dw read from the asynchronous stream accumulation unit 222 is less than a predefined synchronous stream transmission start threshold (step S7). When the remaining time until the asynchronous stream interval end is less than the transmission start threshold, a synchronous stream acquisition process is started under control of the control unit 240 (step S8). Thereby, until the asynchronous stream reproduction ends, a packet of a subsequent synchronous stream is acquired.

Subsequently, it is determined whether or not the remaining time until the interval end of the asynchronous stream Dw is less than a predefined acquisition process end threshold (step S9). When the remaining time until the interval end of the asynchronous stream Dw is equal to or greater than the predefined acquisition process end threshold, the determination is repeated by returning to step S7. When the remaining time until the interval end of the asynchronous stream Dw is less than the predefined acquisition process end threshold, the acquisition process of the asynchronous stream Dw ends (step S10). It is determined whether or not the next interval exists in a future time position in the reproduction time position (step S11).

When the next interval exists, it is determined whether or not a stream existing in the interval is the asynchronous stream Dw (step S12). The process is continued by returning to step S6 in the case of the asynchronous stream Dw and a synchronous stream session is started under control of the control unit 240 in the case of the synchronous stream, not the asynchronous stream Dw (step S13).

Then, the synchronous stream acquisition is started through the synchronous stream session (step S14). It is determined whether or not the remaining time until the interval end of the synchronous stream is less than the predefined acquisition process threshold during the synchronous stream acquisition process (step S15) and the determination of step S15 is repeated when it is equal to or greater than the acquisition process threshold. In the case of less than the acquisition process threshold, the synchronous stream acquisition process is ended (step S16) and also the synchronous stream session is ended (step S17). Thereafter, it proceeds to step S11 and determines whether or not the next interval exists. The above-described process is performed by proceeding to step S12 when the next interval exists, and the loop ends when the next interval does not exist (step S18).

In the above-described embodiment, before the start of viewing, that is, at timing that is not synchronized with the reproduction time of the original video contents V, a plurality of partial streams each having a unique time length are accumulated as the asynchronous streams Dw in the portable telephone terminal 200. Then, at the reproduction time of the video contents V, the accumulated asynchronous streams Dw are read and reproduced. That is, at a reproduction start time, a connection to the portable telephone communication network 2 does not need to be performed. Thereby, since delay occurring at the reproduction start time is suppressed to a minimum limit, stress that the user feels at the reproduction operation time can be reduced.

According to the above-described embodiment, the user can search for a scene to be viewed by changing a type of asynchronous stream Dw to be reproduced on the screen through a UI of the soft keys Sk, etc. shown in FIG. 4. Then, in this case, since a pre-accumulated asynchronous stream Dw is used, access to the portable telephone communication network 2 is not performed. That is, the user can perform an operation for searching for and accessing a scene to be viewed at high speed.

According to the above-described embodiment, the asynchronous stream Dw is accumulated in the portable telephone terminal 200, for example, upon recording the video contents V, asynchronously with a viewing situation of the video contents V by the user. Thereby, the user can zap the video contents V using the asynchronous stream Dw accumulated within the portable telephone terminal 200 in a time period of a gap of a lunch break or etc.

According to the above-described embodiment, a difference stream that is not accumulated as the asynchronous stream Dw is transmitted from the recorder 100 through the network and acquired as the synchronous stream. Then, it is seamlessly coupled with the asynchronous stream Dw during reproduction. Thereby, the user can view the entire video contents V by taking the asynchronous stream Dw, selected as a scene to be viewed, as the starting point.

That is, according to the above-described embodiment, a high-efficient access property to each asynchronous stream (scene) obtainable in the case where the entire video contents V are all accumulated in the portable telephone terminal 200 in a large volume can be obtained by accumulating partial streams, having sufficiently small capacity as compared to capacity of the entire video contents V, as the asynchronous streams Dw in the portable telephone terminal 200.

According to the above-described embodiment, start timing of the synchronous streaming session is flexibly controlled according to a situation of the portable telephone communication network 2. Thereby, even when the portable telephone communication network 2 is in an unstable state, a viewing environment whose robustness is high can be provided to the user.

According to the above-described embodiment, delay can be avoided even when the portable telephone communication network 2 is unstable due to a band change or fluctuation by setting a time length of the asynchronous stream Dw to a length of an extent in which delay occurring due to instability of the portable telephone communication network 2 can be absorbed.

According to the above-described embodiment, the synchronous stream session is started when the remaining time until the interval end of the asynchronous stream Dw is less than the predefined acquisition process end threshold, but a configuration may be made to start the synchronous stream session when the user inputs any operation for making a sequel interval view command. In this case, since a UI for accepting the sequel interval view is generated, it does not need to be displayed on a display screen or etc.

In the above-described first embodiment, an example in which the asynchronous stream is accumulated in the portable telephone terminal 200 before the video contents V are viewed has been described, but a configuration may be made to dynamically acquire the asynchronous stream before viewing. In the following description, a scheme for acquiring the asynchronous stream before viewing is referred to as an "acquisition scheme before viewing" and a scheme for acquiring the asynchronous stream during viewing is referred to as an "acquisition scheme during viewing".

Figure 10:
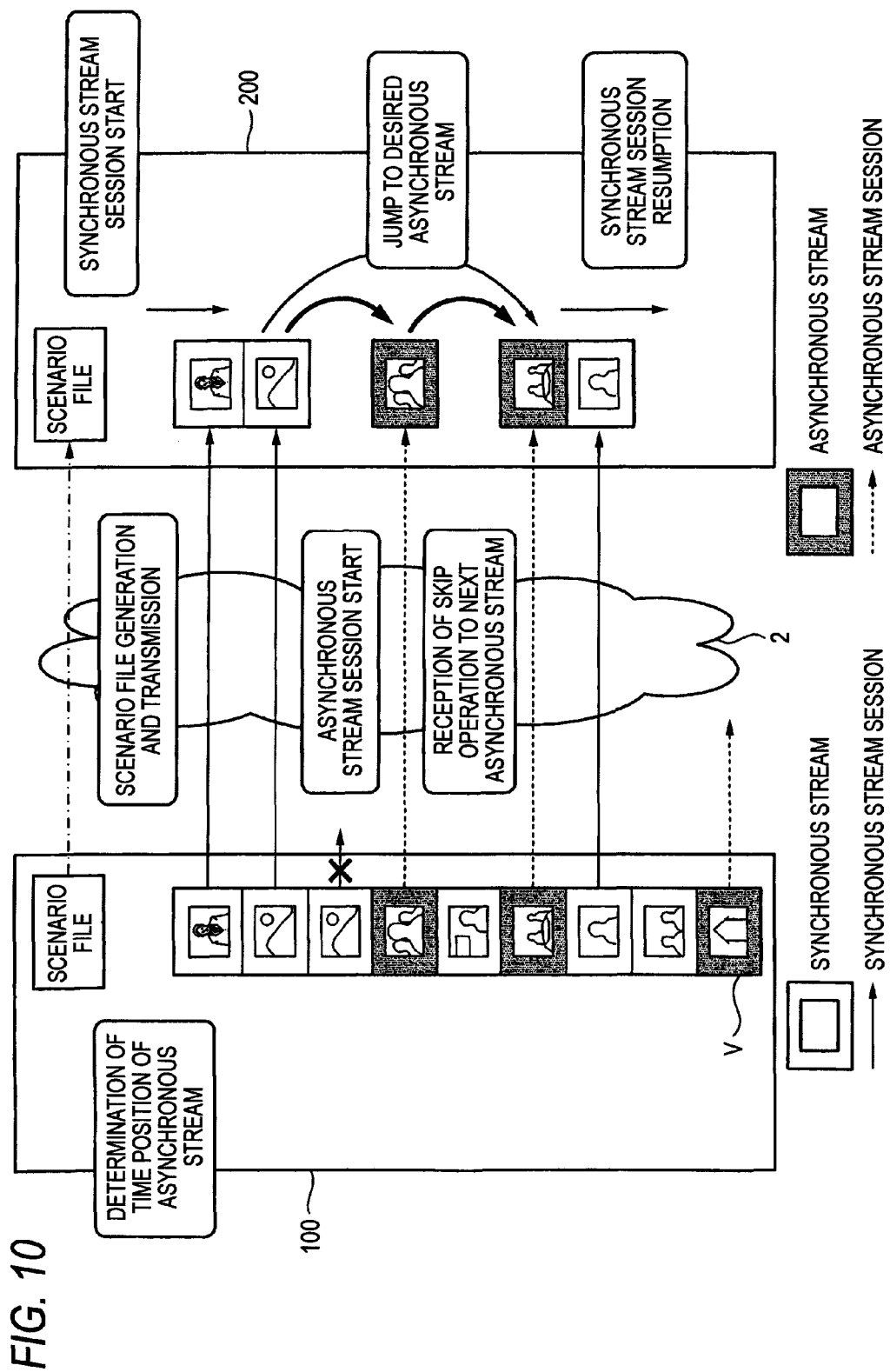
FIG. 10 is an illustrative view showing a schematic example of a system according to a first modified example of the first embodiment of the present invention.

FIG. 10 shows a system outline when the acquisition scheme during viewing is adopted. In FIG. 10, a recorder 100 is shown on the left side and a portable telephone terminal 200 is shown on the right side. In the vertical direction of FIG. 10, a reproduction time of video contents V and a time of viewing by the user are shown. In the acquisition scheme during viewing, first, time positions of a plurality of asynchronous streams Dw are determined in the recorder 100. Then, the recorder 100 describes the determined time position information of the asynchronous streams Dw in a scenario file and the generated scenario file is transmitted to the portable telephone terminal 200.

When a viewing start command of the video contents V is received from the user, the portable telephone terminal 200 first starts a synchronous stream session and receives several synchronous streams on the basis of a description of a scenario file received from the recorder 100. After a regular time has elapsed therefrom, a reproduction time position at a time point thereof is compared to time position information of a plurality of asynchronous streams serving as an acquisition target and an acquisition request of a proper asynchronous stream Dw is transmitted to the recorder 100. Here, an asynchronous stream Dw having information of a future time position than a reproduction time position is selected as a proper stream. An asynchronous stream session is started by this process, such that a plurality of asynchronous streams are transmitted from the recorder 100 to the portable telephone terminal 200.

The user can skip to an acquired asynchronous stream corresponding to a future time position than a reproduction time position using the soft keys Sk, etc. shown in FIG. 4A while viewing a stream reproduced on the screen of the portable telephone terminal 200. When the acquired asynchronous stream is list-displayed as shown in FIG. 4B, a jump operation to a desired asynchronous stream can be performed.

When the reproduction time position is varied by the above-described operation, reproduction can be realized without delay by accessing the acquired asynchronous stream immediately thereafter. In this regard, when the reproduction time position is varied on the basis of the operation by the user, a process for stopping an asynchronous stream session performed before the reproduction time position is varied and acquiring a proper stream based on reproduction time information is performed. Then, after the proper stream is acquired, the stopped asynchronous stream session is resumed.

On the other hand, when a local access process to an acquired asynchronous stream Dw begins, a synchronous stream session is stopped. Thereby, asynchronous streams Dw can be acquired by fully using a band of the portable telephone communication network 2. Thereafter, when a reproduction interval of the acquired asynchronous stream Dw reaches the last, transition from an asynchronous stream access process within the portable telephone terminal 200 to a synchronous stream access process can be seamlessly performed by resuming the synchronous stream session on the basis of end time information of the asynchronous stream Dw.

Figure 11:
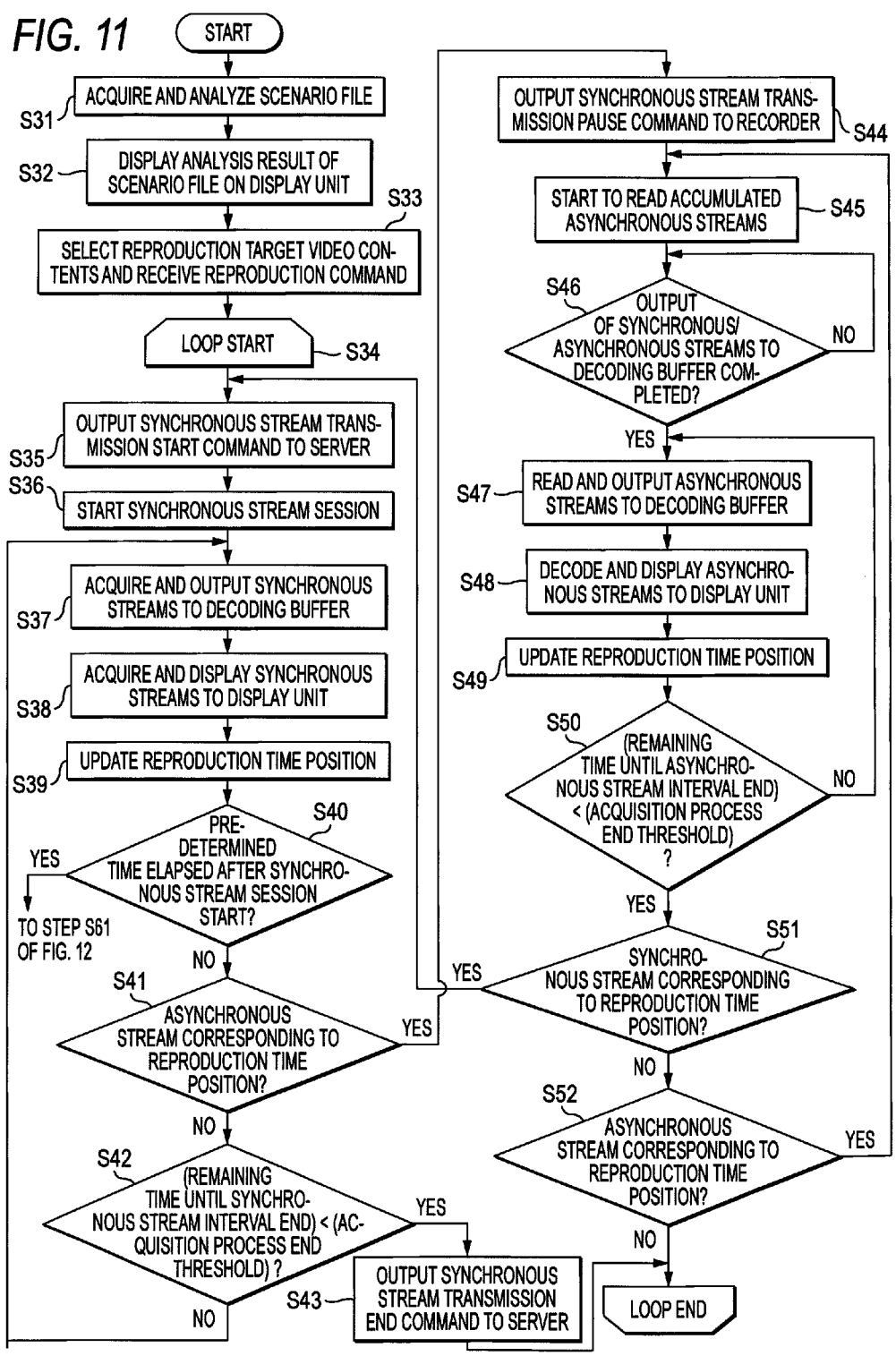
FIG. 11 is a flowchart showing an example of an asynchronous stream acquisition process according to the first modified example of the first embodiment of the present invention.

Next, an example of a detailed process for realizing the acquisition scheme during viewing will be described with reference to the flowchart of FIG. 11. First, before the video contents V are viewed, a scenario file transmitted from the recorder 100 is received by the scenario file reception unit 211 (see FIG. 5) and analyzed by the scenario file analysis unit 221 (step S31). Then, information of a name (title) or a reproduction time of each content obtained as the analysis result of the scenario file is displayed on the display unit 228 (see FIG. 5) (step S32).

When an operation for selecting video contents V to be viewed by the user and reproducing the selected video contents V is performed on the basis of the information displayed on the display unit 228 (step S33), a "loop" is started (step S34).

In the loop, first, a synchronous stream transmission command is transmitted from the distribution request unit 215 to the recorder 100 (step S35) and the synchronous stream session is started (step S36). Then, the synchronous stream transmitted from the recorder 100 is output to the decoding buffer 224 on the basis of the transmission command (step S37). The synchronous stream output to the decoding buffer 224 is decoded by the decoding unit 225 and the decoded synchronous stream is reproduced on the display unit 228 on the basis of control of the reproduction control unit 227 (step S38). Then, the reproduction time position is updated according to a reproduction situation in the display unit 228 (step S39).

Next, after the start of the synchronous stream session, it is determined whether or not a predetermined time defined in advance has elapsed (step S40). When the predetermined time has elapsed, the process transitions to the next process shown in FIG. 12. When the predetermined time has not elapsed, it is determined whether or not the asynchronous stream Dw corresponding to the reproduction time position exists (step S41).

When the asynchronous stream Dw does not exist, it is determined whether or not the remaining time until an interval end of the synchronous stream is less than an acquisition process end threshold (step S42). When the remaining time until the interval end of the synchronous stream is less than the acquisition process end threshold, a synchronous stream transmission end command is transmitted from the distribution request unit 215 to the recorder 100 (step S43) and the process ends. When the remaining time until the interval end of the synchronous stream is equal to or greater than the acquisition process end threshold, the process is performed by returning to step S37.

When it is determined that the asynchronous stream Dw corresponding to the reproduction time position exists in step S41, a command for pausing synchronous stream transmission is transmitted from the distribution request unit 215 to the recorder 100 (step S44). Then, the asynchronous stream acquisition unit 223 starts to read the already acquired asynchronous stream Dw from the asynchronous stream accumulation unit 222 (step S45).

Next, it is determined whether or not the output of the synchronous or asynchronous stream to the decoding buffer 224 is completed (step S46), the determination of step S46 is continued while the output is not completed. When the output to the decoding buffer 224 is completed, the asynchronous stream Dw is read from the asynchronous stream accumulation unit 222 and the read asynchronous stream Dw is output to the decoding buffer 224 (step S47).

The asynchronous stream Dw output to the decoding buffer 224 is decoded by the decoding unit 225 and reproduced on the display unit 222 (step S48). Then, the reproduction time position is updated according to a reproduction situation in the display unit 228 (step S49).

Next, it is determined whether or not the remaining time until an interval end of the asynchronous stream is less than an acquisition process end threshold (step S50). When the remaining time until the interval end of the asynchronous stream is equal to or greater than the acquisition process end threshold, the process is continued by returning to step S47. When the remaining time until the interval end of the asynchronous stream is less than the acquisition process end threshold, it is determined whether or not a synchronous stream corresponding to the reproduction time position exists (step S51).

When the synchronous stream corresponding to the reproduction time position exists, the process is continued by returning to step S35. When the synchronous stream corresponding to the reproduction time position does not exist, it is then determined whether or not another asynchronous stream corresponding to the reproduction time position exists (step S52). When the other asynchronous stream corresponding to the reproduction time position exists, the process is continued by returning to step S45. When it does not exist, the loop is ended.

Next, the asynchronous stream acquisition process when "YES" is selected in step S40 of FIG. 11 will be described with reference to FIG. 12. First, when an asynchronous stream transmission command is transmitted from the asynchronous stream control unit 212 to the recorder 100 on the basis of control of the control unit 240 (step S61), the asynchronous stream session is started between the recorder 100 and the portable telephone terminal 200 (step S62).

Then, the asynchronous stream acquisition is started through the asynchronous stream session (step S63). When a view time interval reaches the last, the asynchronous stream acquisition process ends (step S64).

According to the above-described embodiment, the acquisition of a synchronous stream by the synchronous stream session and the acquisition of an asynchronous stream Dw by the asynchronous stream session are performed on the same time line. In this case, an asynchronous stream Dw of a time position different from a reproduction time position at the time point thereof is acquired. When an access point to a scene capable of jumping or skipping is considered as the acquired asynchronous stream Dw, the number of access points which do not exist at the view start time automatically increases during viewing of the video contents V by performing the above-described process. Thereby, an access property to a user-desired scene is improved rapidly.

In each embodiment as described above, a form in which the asynchronous stream Dw is generated/accumulated in advance within the recorder 100 is assumed, but a form in which the recorder 100 dynamically generates the asynchronous stream Dw according to a reproduction time position may be made.

In each embodiment as described above, an example in which a plurality of asynchronous streams Dw are acquired in chronological order by setting a reproduction time position selected by the user to the starting point is described, but a configuration may be made to acquire an asynchronous stream selectively (step by step). Thereby, two accesses of panoramic access for detecting the entire image of the video contents V and access to a minute scene around the reproduction time position can be realized. In this example, a configuration and method for realizing the selective acquisition as described above in the acquisition scheme during viewing are described.

Specifically, a layer concept is introduced into an asynchronous stream. Layer 1 is assigned to asynchronous streams from which a temporal distance for detecting the entire program is relatively separated, while layer 2 or a higher layer is assigned to asynchronous streams to which a temporal distance for minute access is close.

FIG. 13 shows a description example of a scenario file when asynchronous streams have two layers of layer 1 and layer 2. In asynchronous stream session information indicated by the <sub_content> tag, 10 asynchronous streams Dw are defined. Then, layer attributes of $1^{st}$, $4^{th}$, and $9^{th}$ lines are set to "1". Layer attributes of $2^{nd}$, $3^{rd}$, $5^{th}$ to $8^{th}$, and $10^{th}$ lines are set to "2".

Figure 12:
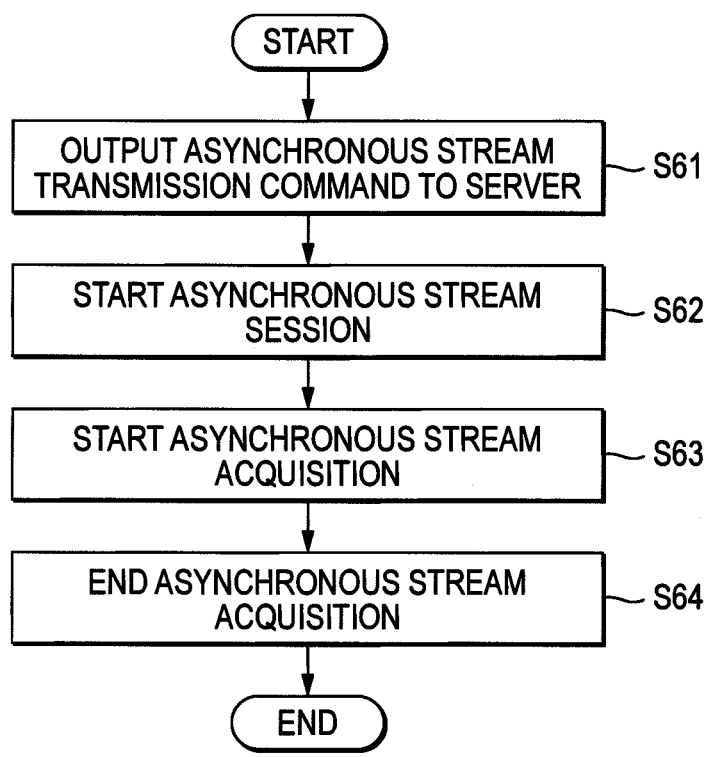
FIG. 12 is a flowchart showing an example of a synchronous stream acquisition process according to the first modified example of the first embodiment of the present invention.
Figure 14:
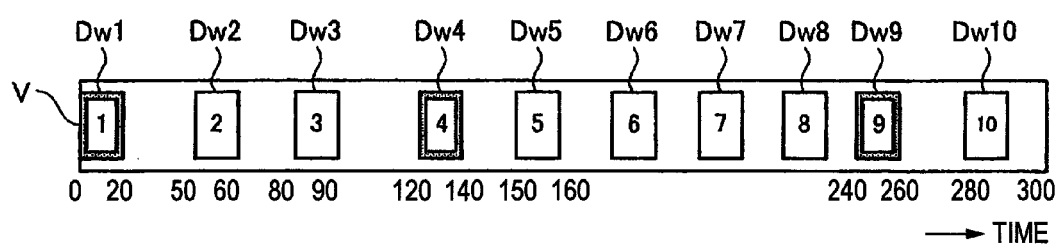
FIG. 14 is an illustrative view showing an example of a layer structure of asynchronous streams according to the second modified example of the first embodiment of the present invention.

FIG. 14 shows a configuration example of asynchronous streams Dw generated on the basis of the scenario file of FIG. 12. The horizontal axis of FIG. 14 represents the time. There is shown an aspect in which the asynchronous streams Dw1 to Dw10 are generated on the basis of the description of the $1^{st}$ to $10^{th}$ lines of the <sub_content> tags of the scenario file shown in FIG. 12 in streams of 300 minutes provided in the original video contents V.

Figure 15:
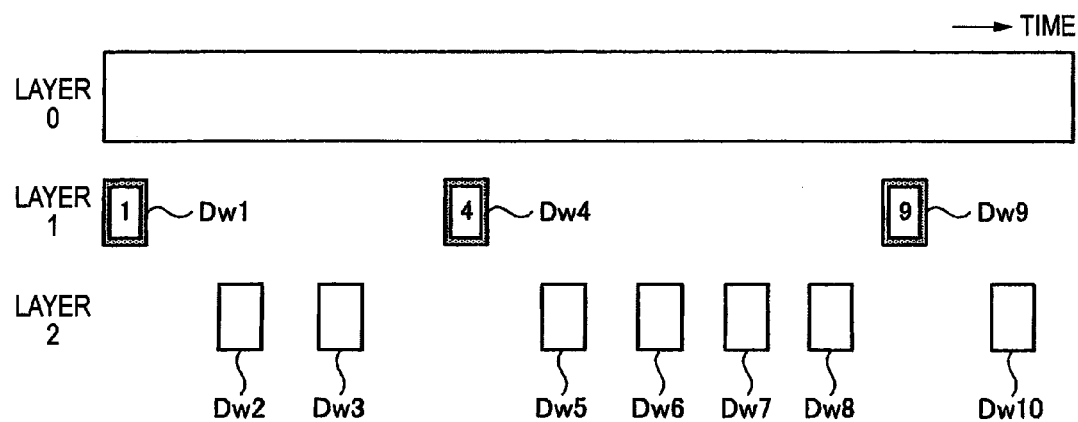
FIG. 15 is an illustrative view showing an example of a layer structure of asynchronous streams according to the second modified example of the first embodiment of the present invention.

In FIG. 15, each asynchronous stream Dw belonging to layer 1 is displayed on the upper stage and each asynchronous stream Dw belonging to layer 2 is displayed on the lower stage. According to FIG. 15, it can be seen that the asynchronous streams Dw1, DW4, and Dw9 to which layer 1 is assigned are relatively separated in the temporal distance, respectively. On the other hand, it can be seen that the asynchronous streams Dw2, Dw3, Dw5 to Dw8, and Dw10 to which layer 2 is assigned are close to each other in the temporal distance.

Figure 16:
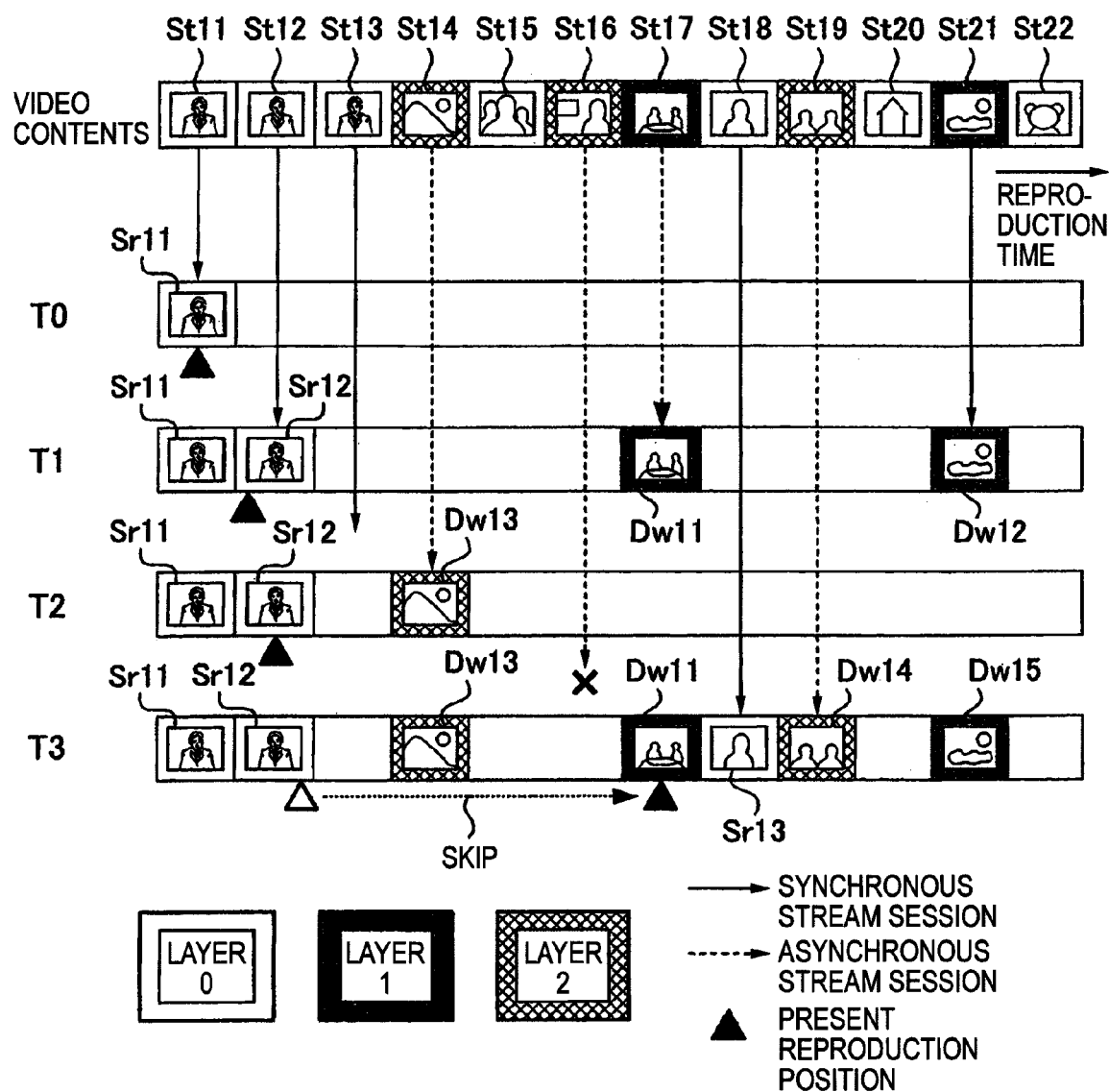
FIG. 16 is an illustrative view showing an example of a process for acquiring asynchronous and synchronous streams according to the second modified example of the first embodiment of the present invention.

FIG. 16 conceptually shows an acquisition sequence of synchronous streams (layer 0) and asynchronous streams (layer 1 and layer 2) at each time. On the top stage of FIG. 16, streams St1 to St12 configuring the original video contents V are arranged and displayed in chronological order. The horizontal axis of FIG. 16 represents the reproduction time in the video contents V.

One layer of layers 0 to 2 is assigned to each of the streams St11 to St22 on the basis of the description of the scenario file. In FIG. 16, streams assigned to layer 0 are indicated by the white frame, streams assigned to layer 1 are indicated by the black frame, and streams assigned to layer 2 are indicated by the mesh frame. Each stream to which layer 0 is assigned is acquired as a synchronous stream Sr synchronous with the reproduction time, and streams to which layer 1 or layer 2 is assigned are acquired as asynchronous streams Dw asynchronous with a viewing situation by the user.

The vertical direction of FIG. 16 indicates the time passage of viewing by the user. In the viewing time, each time is indicated by T0 to T3. Time T0 is a time when the synchronous stream session is started. At this timing, the synchronous stream acquisition of layer 0 is started. In the figure, there is shown a state in which the stream St11 as the first stream among the streams to which layer 0 is assigned is acquired as a synchronous stream Sr11.

At a time point of time T1 when a predetermined time has elapsed from time T0, the streams of layer 1 for supporting panoramic detection of the entire video contents V are acquired until the end time of the video contents V while synchronous streams Sr of layer 0 are acquired. That is, the stream St17 and the stream St21 to which layer 1 is assigned are acquired as an asynchronous stream Dw11 and an asynchronous stream Dw12.

At a time point of time T2, the acquisition of asynchronous streams Dw belonging to layer 2 placed in an interval currently being viewed by the user is started. That is, the stream St14, to which layer 2 is assigned, placed in an interval to which a present reproduction position indicated by the black triangle mark belongs is acquired as an asynchronous stream Dw13.

At a time point of time T3, the reproduction time position moves to a position of the asynchronous stream Dw11 existing in the next interval on the basis of a reproduction skip operation by the user. Since a layer attribute of the asynchronous stream Dw11 of a movement destination is "1", the acquisition of the asynchronous stream (stream St16) of layer 2 of the previous interval is stopped and the synchronous stream session of the next interval and the asynchronous stream session of layer 2 are started. In the figure, there is shown an aspect in which the stream St18 is acquired as a synchronous stream Sr13 by the synchronous stream session of the next interval, and the stream St19 as the asynchronous stream Dw14 and the stream St21 as the asynchronous stream Dw15 are acquired by the asynchronous stream session.

As described above, since the reproduction time position is dynamically varied by the skip operation by the user, asynchronous stream acquisition preparation and timing control are adaptively performed in this example.

Figure 17A:
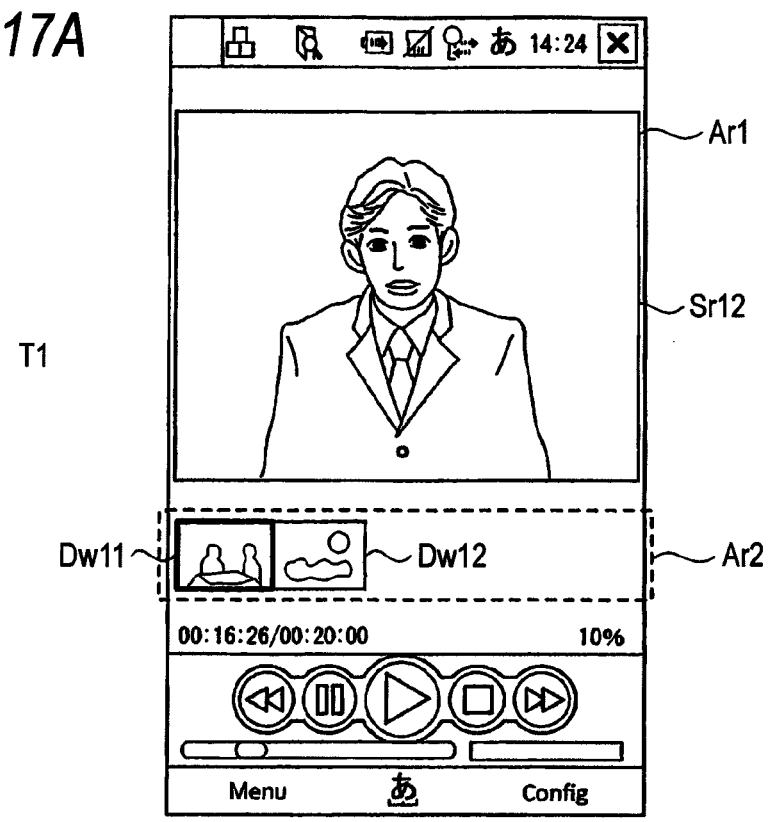
FIGS. 17A and 17B are illustrative views showing a screen display example of asynchronous or synchronous streams according to the second modified example of the first embodiment of the present invention.
Figure 17B:
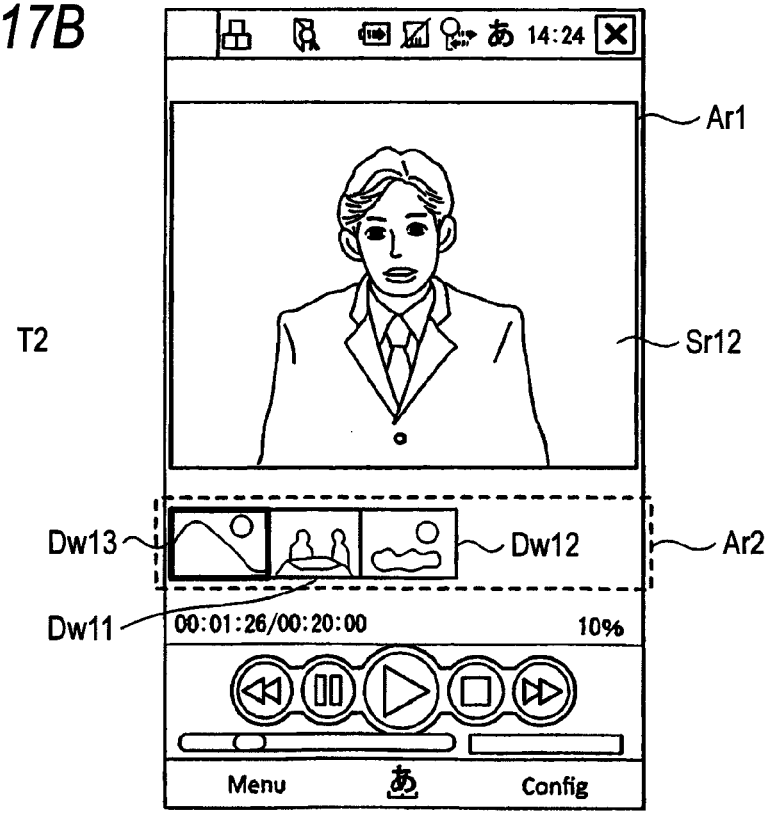

FIGS. 17A and 17B show a screen display example of the portable telephone terminal 200 at times T1 and T2 of FIG. 16. At time T1 of FIG. 16, the present reproduction position is placed to a synchronous stream Sr12. That is, as shown in FIG. 17A, on the screen of the portable telephone terminal 200, an image of the synchronous stream Sr12 is reproduced.

Below an area Ar1 where the synchronous stream Sr12 is displayed, there is an area Ar2 where the acquired synchronous stream Sr or the asynchronous stream Dw is displayed. Then, at the time point of time T1 shown in FIG. 17A, the asynchronous stream Dw11 and the asynchronous stream Dw12 acquired at the time of T1 are thumbnail-displayed in the area Ar2.

A screen example at a time point as the time of T2 when viewing is directly continued is shown in FIG. 17B. In FIG. 17B, a thumbnail of the asynchronous stream Dw13 is inserted into a position of a left end of the area Ar2. According to this example as described above, a proper synchronous stream Sr or asynchronous stream Dw is acquired according to a reproduction time position and displayed as the thumbnail in the area Ar2 on the screen. That is, while reproduction is performed, the number of access points capable of being randomly accessed by the user automatically increases in the area Ar.

According to the above-described embodiment, asynchronous streams Dw of layer 1 are first preferentially acquired at a time point when a predetermined time has elapsed from the beginning of viewing. Thereby, in a wide time interval in which the entire video contents V are targeted, a random access function to a desired scene is provided to the user in an early step when viewing begins.

According to the above-described embodiment, after an asynchronous stream Dw of layer 1 is acquired, an asynchronous stream Dw of layer 2 placed between the asynchronous stream Dw belonging to layer 1 and the next asynchronous stream Dw belonging to the same layer 1 is acquired according to a reproduction time position varying on the basis of a reproduction situation or the skip or jump operation by the user. Thereby, the user can perform another skip or jump operation in the vicinity of contents of an access destination. That is, more-minute scene access is performed.

That is, according to the above-described embodiment, two accesses of panoramic access fox detecting the entire image of the video contents V and minute scene access in the vicinity of the reproduction time position are realized.

In the above-described embodiment, an example of an application to the "acquisition scheme during viewing" is described, but an application to the "acquisition scheme before viewing" is possible. In the "acquisition scheme before viewing", the asynchronous streams Dw are pre-accumulated, but its accumulation capacity increases in proportion to the number of selected video contents V. That is, when a number of video contents V are selected, there is a possibility that the storage unit 101 of the portable telephone terminal 200 is stressed.

As a method for preventing the occurrence of the above-described situation, a method for giving priority to the diversity of video contents V is considered instead of a method for increasing an access property to a desired scene within the video contents V. Specifically, for example, when only a head portion and a middle time position of the original video contents V are pre-acquired as the asynchronous streams Dw, it is assumed that the stress of the storage unit 101 can be prevented. However, in this case, asynchronous streams of many types of video contents V can be accumulated in the storage unit 101, but the number of scenes capable of being skipped or jumped within the individual video contents V is limited to a very small value.

Then, like the case of the "acquisition scheme during viewing", a layer concept is also introduced into the "acquisition scheme before viewing" and asynchronous streams Dw of layer 1 are acquired/accumulated before viewing. Then, after viewing begins, asynchronous streams of layer 2 are dynamically acquired according to a reproduction time position within asynchronous streams of layer 1 existing in an interval of an access destination. By performing the above-described control operation, access to each scene within the video contents V can also increase in the "acquisition scheme before viewing"

In the above-described embodiment, an example in which a time position and a time length of each asynchronous stream Dw generated from the video contents V are fixedly pre-set has been described, but it is not limited thereto. For example, they can be dynamically determined using a scene detection technology or a media summary technology.

Figure 18:
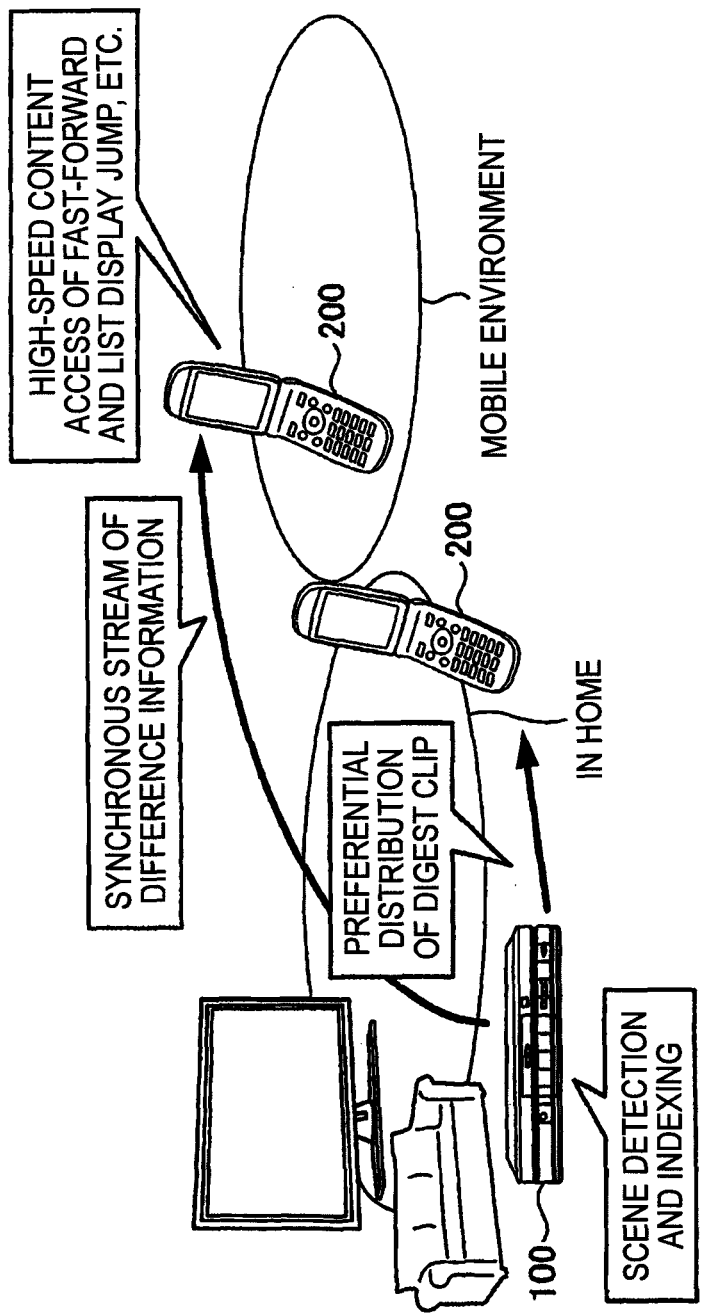
FIG. 18 is an illustrative view showing a schematic example of a system according to a third modified example of the first embodiment of the present invention.

FIG. 18 is a view illustrating an example of a system outline in this case. In FIG. 18 like FIG. 1, a space in a home is shown on the left side and a mobile environment is shown on the right side. In the home, there is a recorder 100 in which video contents V are recorded. In the recorder 100, a highlight scene extracted using a scene detection method is accumulated as an asynchronous stream Dw. That is, in this case, the asynchronous stream Dw plays a role of a digest clip. Then, the user transmits each asynchronous stream Dw accumulated in the recorder 100 to a portable telephone terminal 200 at timing before outing, etc.

In the mobile environment, a plurality of pre-accumulated asynchronous streams Dw are reproduced on the portable telephone terminal 200 and the user determines a reproduction position desired for viewing by selecting an arbitrary asynchronous stream. At this time, since access to a portable telephone communication network 2 is not performed, a fast-forward or jump operation can be performed at high speed.

After the reproduction position desired for viewing is determined, a difference stream which is not accumulated in the portable telephone terminal 200, that is, a stream having a scene which is not detected as a highlight scene, is transmitted from the recorder 100 in the home through the portable telephone communication network 2. Thereby, the user can search for a scene to be viewed from among a plurality of highlight scenes. The video contents V can be all viewed by taking a selected scene as the starting point.

In each embodiment described above, an example of pre-generating asynchronous streams Dw in the recorder 100 has been described, but the asynchronous streams Dw may be dynamically generated by sequentially extracting streams of a corresponding time part.

Figure 19:
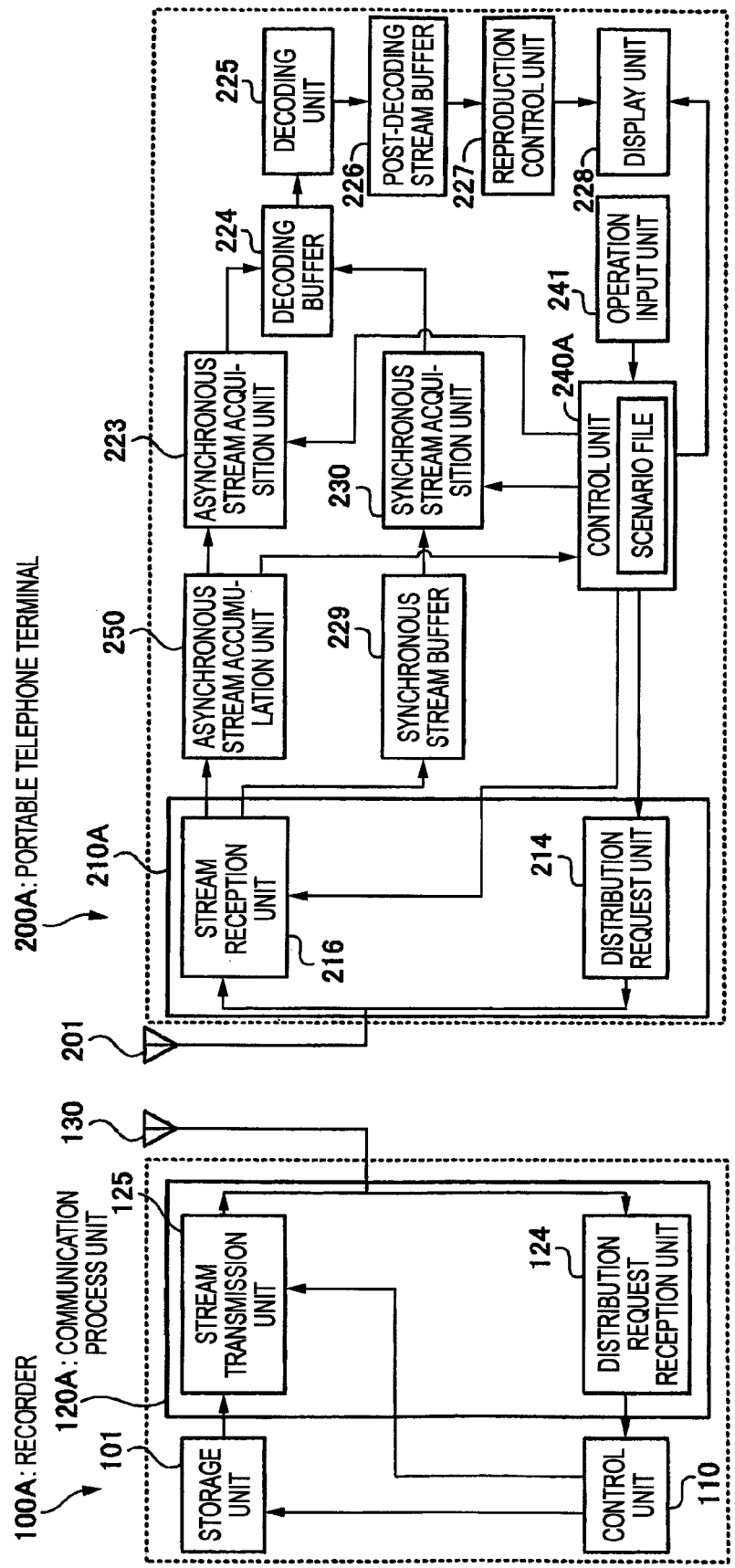
FIG. 19 is a block diagram showing an internal configuration example of a system according to a second embodiment of the present invention.

Next, a second embodiment of the present invention will be described with reference to the block diagram of FIG. 19 and the flowchart of FIG. 20. In this embodiment, the portable telephone terminal 200 side located in a client generates a scenario file. In FIG. 19, the same reference numerals are assigned to parts corresponding to those of FIG. 5, and their detailed description is omitted.

A system shown in FIG. 19 is configured by a recorder 100A and a portable telephone terminal 200A. In this example, the recorder 100A includes a storage unit 101 in which video contents V are stored, a control unit 110, and a communication process unit 120A. The communication process unit 120A is configured by a stream transmission unit 125 and a distribution request reception unit 124.

When a distribution request transmitted from the portable telephone terminal 200A is received, the control unit 110 reads the video contents V designated within the distribution request to the stream transmission unit 125 from the storage unit 101 and commands the portable telephone terminal 200A to transmit them. On the basis of a command by the control unit 110, the stream transmission unit 125 reads corresponding video contents V from the storage unit 101 and transmits a stream to the portable telephone terminal 200A.

The portable telephone terminal 200A includes a communication process unit 210A for transmitting and receiving data to and from the recorder 100A, an asynchronous stream accumulation unit 250, an asynchronous stream acquisition unit 223, a synchronous stream buffer 229, and a synchronous stream acquisition unit 230. It further includes a decoding buffer 224, a decoding unit 225, a decoding stream buffer 226, a control unit 240A, an operation input unit 241, a display unit 228, and a reproduction control unit 227.

In this example, a pre-created scenario file is accumulated in the control unit 240A. The control unit 240A analyzes the scenario file and performs an acquisition control operation of an asynchronous stream Dw or a synchronous stream on the basis of location information, etc. of asynchronous streams Dw described in the scenario file. Specifically, a process for generating the distribution request of the asynchronous stream Dw or the synchronous stream and transmitting it from a distribution request unit 214 to the recorder 100A is performed.

The communication process unit 210A is configured by a stream reception unit 216 for receiving a stream transmitted from the stream transmission unit 125 of the recorder 100A and the distribution request unit 214. The asynchronous stream accumulation unit 250 receives and accumulates the asynchronous stream Dw distributed from the recorder 100A on the basis of the distribution request from the distribution request unit 214. Since a process for reading the accumulated asynchronous stream Dw and a process subsequent thereto are the same as those of the first embodiment, their description is omitted.

In an example shown in FIG. 19, an example in which the portable telephone terminal 200A side acquires the asynchronous stream Dw or the synchronous stream from the recorder 100A on the basis of content recorded in the pre-generated scenario file has been described, but it is not limited thereto. For example, a distribution request of a stream having a time length at a predetermined time interval is made from the distribution request unit 214 to the recorder 100A. In response to the request, the stream transmitted from the recorder 100A can be accumulated as an asynchronous stream Dw.

Figure 20:
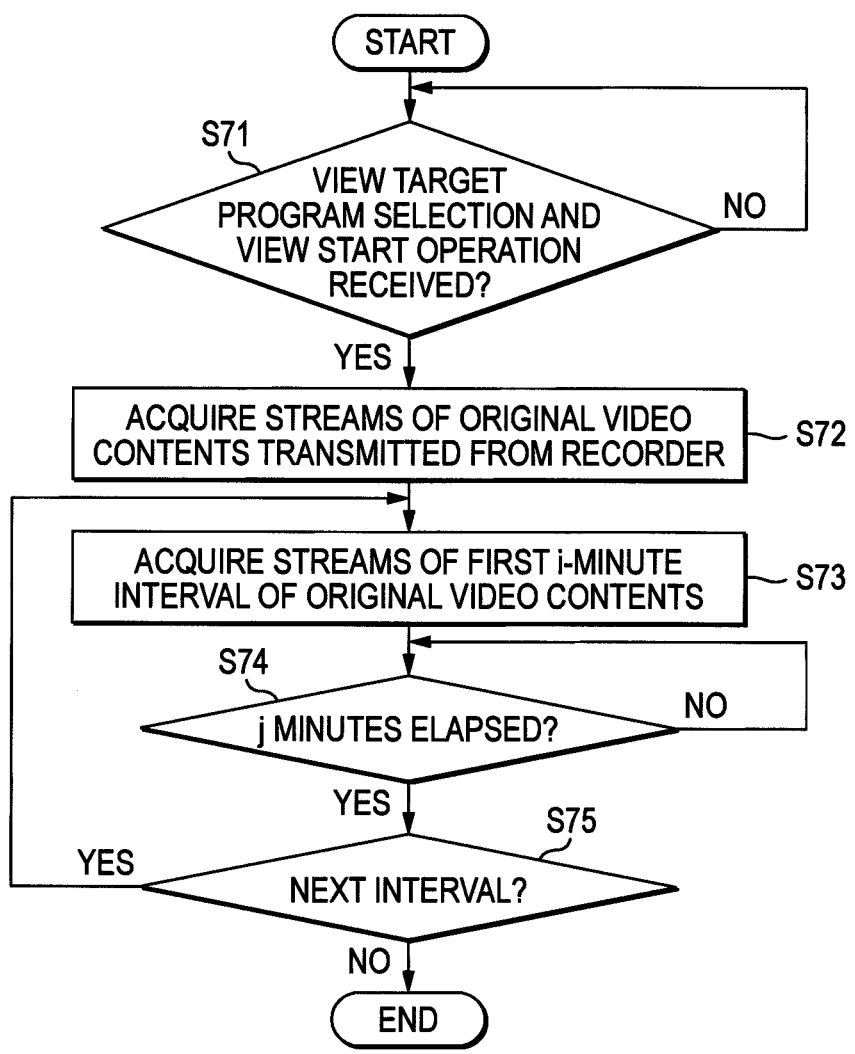
FIG. 20 is a flowchart showing an example of an asynchronous stream accumulation process according to the second embodiment of the present invention.

An example of a process when the above-described configuration is made is shown in FIG. 20. In FIG. 20, an acquisition interval of the asynchronous stream Dw is expressed by "j" and a time length of the asynchronous stream Dw is expressed by "i".

First, it is determined whether or not the user makes a command of selection and reproduction of video contents V of a reproduction target (step S71). When this operation is performed, streams of the original video contents V transmitted from the recorder 100A are received by the stream reception unit 216 (step S72). Then, an interval of first i minutes among the received streams is acquired by the asynchronous stream accumulation unit 250 and accumulated as the asynchronous stream Dw (step S73).

Next, it is determined whether or not j minutes have elapsed therefrom (step S74). When the j minutes have not elapsed, the determination of step S74 is repeated. When it is determined that the j minutes have elapsed, it is determined whether or not the next interval exists in the streams acquired in step S72 (step S675). When the next interval exists, an asynchronous stream Dw of the next interval is generated and accumulated by returning to step S73. When the next interval does not exist, the process ends here.

As described above, the portable telephone terminal 200A has each function described above, thereby realizing a high-speed and low-delay access function using the asynchronous streams Dw even when the recorder 100A in which the video contents V are recorded does not have a function for generating the asynchronous streams Dw.

Figure 21:
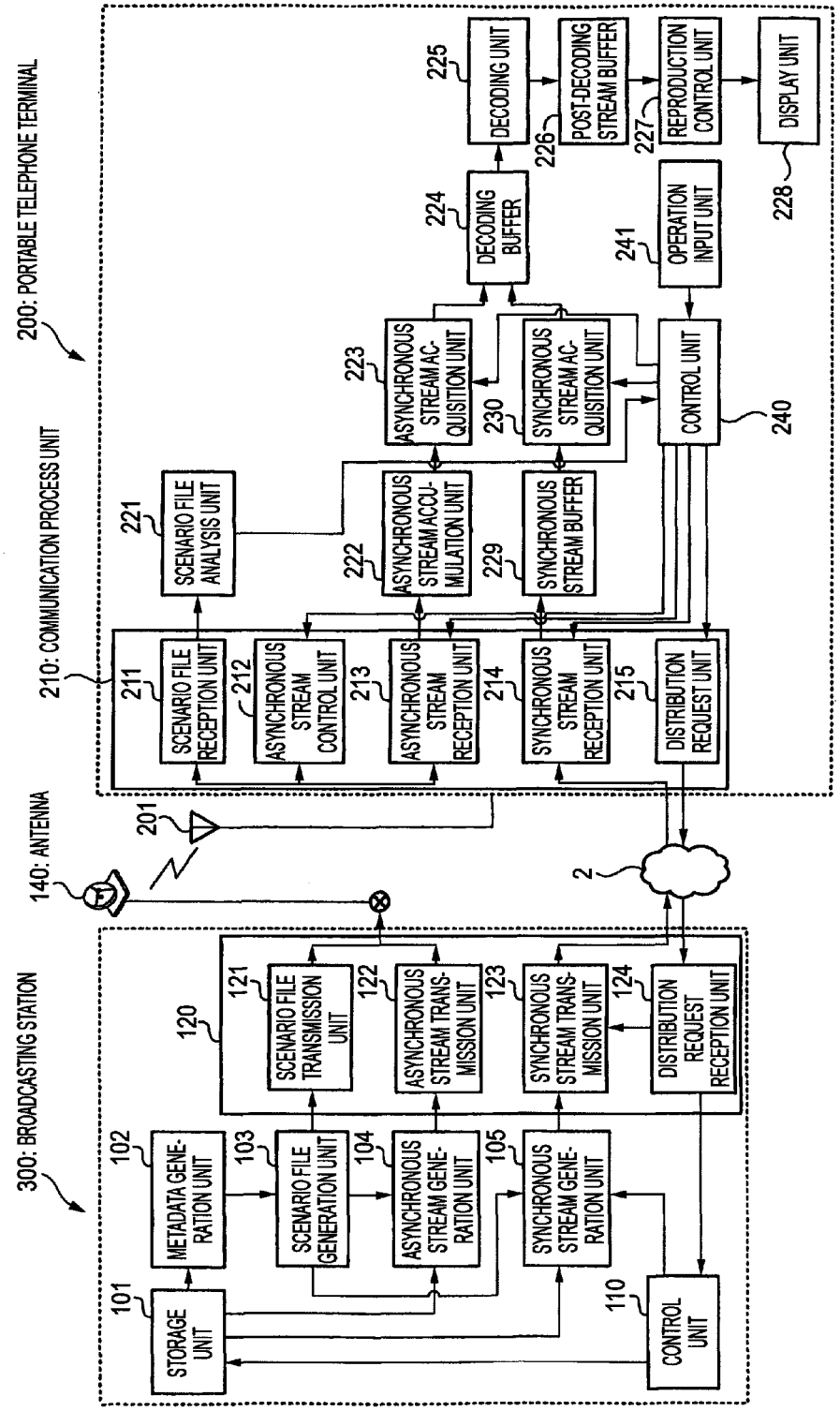
FIG. 21 is a block diagram showing an internal configuration example of a system according to a third embodiment of the present invention.

Next, a third embodiment of the present invention will be described with reference to the block diagram of FIG. 21. In FIG. 21, the same reference numerals are assigned to parts corresponding to FIGS. 5 and 19 and their detailed description is omitted. According to this embodiment, a system is configured by a broadcasting station 300 for broadcasting video contents V and a portable telephone terminal 200. Then, the broadcasting station is configured to generate and transmit an asynchronous stream Dw and transmit a synchronous stream.

The broadcasting station 300 shown in FIG. 21 has all functional blocks provided in the recorder 100 shown in FIG. 5. A difference from the recorder 100 shown in FIG. 5 is that a scenario file and an asynchronous stream are transmitted to the portable telephone terminal 200 through an antenna 140, but the reception of a distribution request transmitted from the portable telephone terminal 200 and the transmission of a synchronous stream are performed, for example, through another communication network of a portable telephone communication network 2 or etc.

When the broadcasting station 300 side is configured to generate and transmit an asynchronous stream Dw and transmit a synchronous stream as described above, the user without the recorder 100 can also perform zapping based on the asynchronous stream Dw and synchronous stream acquisition on the portable telephone terminal 200.

Figure 22:
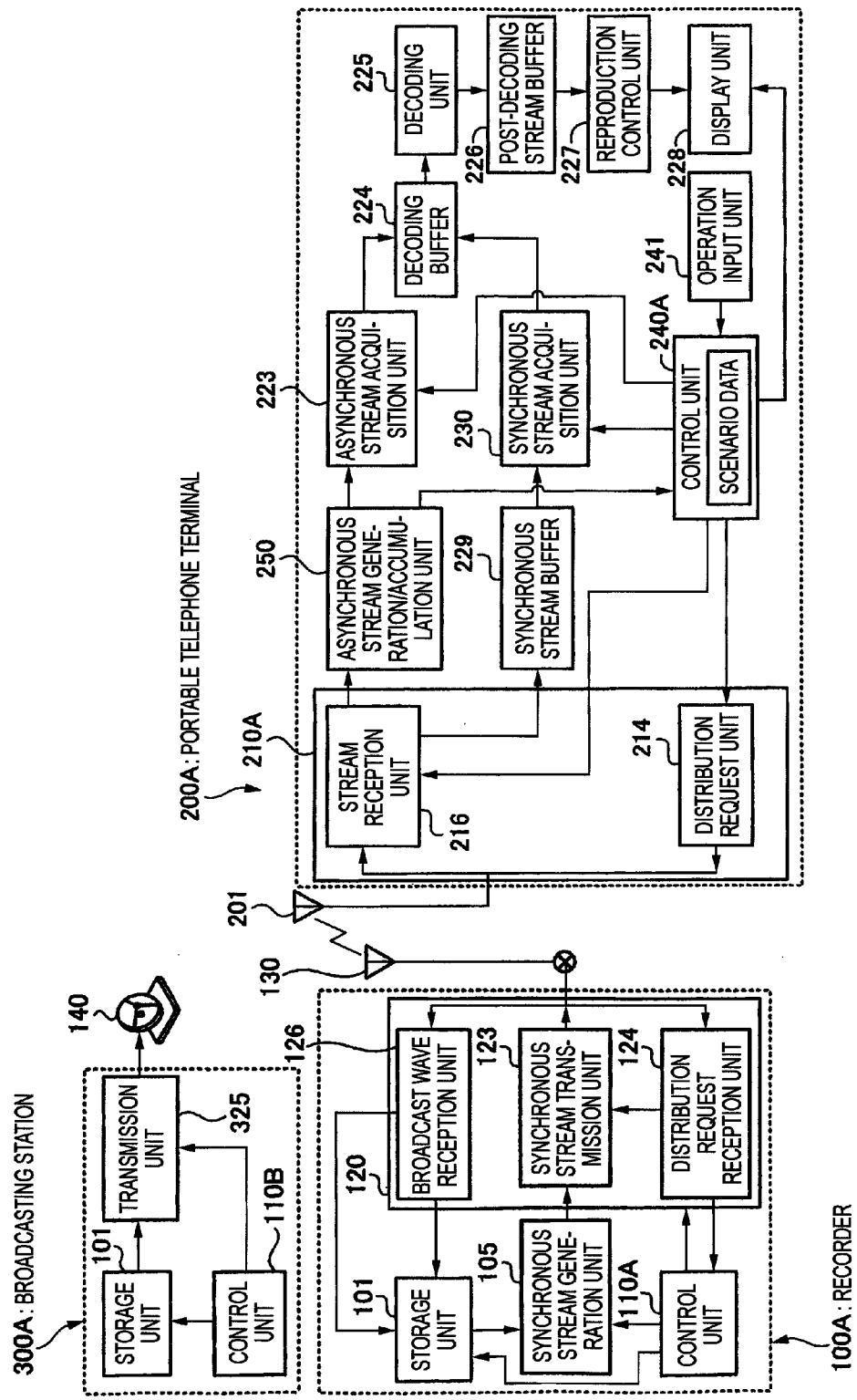
FIG. 22 is a block diagram showing an internal configuration example of a system according to a fourth embodiment of the present invention.

Next, a fourth embodiment of the present invention will be described with reference to the block diagram of FIG. 22. In FIG. 22, the same reference numerals are assigned to parts corresponding to FIGS. 5, 19, and 21 and their detailed description is omitted. According to this embodiment, a system is configured by a broadcasting station 300A for broadcasting video contents V, a recorder 100A, and a portable telephone terminal 200A.

The broadcasting station 300A shown in FIG. 22 has a storage unit 101 in which the video contents V are accumulated, a transmission unit 325 for transmitting the video contents V through a broadcast wave, and a control unit 110B. That is, only the transmission of the video contents V is performed as in the conventional broadcasting station.

The recorder 100A has a broadcast wave reception unit 126 for receiving a broadcast wave, a storage unit 101 for accumulating the video contents V received by the broadcast wave reception unit 126, a control unit 110A, a distribution request reception unit 124, a synchronous stream generation unit 105, and a synchronous stream transmission unit 123. That is, according to this example, the recorder 100A accumulates the video contents V transmitted from the broadcasting station 300A in the storage unit 101. When a distribution request from the portable telephone terminal 200A is made, the synchronous stream generation unit 105 generates a synchronous stream on the basis of its request content. Then, the generated synchronous stream is transmitted to the portable telephone terminal 200A through the synchronous stream transmission unit 123 and an antenna 130.

The portable telephone terminal 200A has the same configuration as shown in FIG. 19. That is, it has a function for generating an asynchronous stream Dw based on the video contents V transmitted from the broadcasting station 300A. Time position information and time length information of each generated asynchronous stream Dw and correspondence information between the information and a reproduction time position in the original video contents V are created and stored as scenario data. Then, a proper synchronous stream or a proper synchronous stream Dw is acquired from the recorder 100A according to a reproduction time position varying with an operation input by the user.

By making a configuration in which the portable telephone terminal 200A generates an asynchronous stream Dw and the recorder 100A generates and transmits a synchronous stream as described, the asynchronous stream Dw can be also generated from video contents V transmitted through a broadcast wave as in the conventional configuration. Then, skip or jump reproduction in which the asynchronous stream Dw is set to the starting point or acquisition and reproduction of contents existing after a reproduction time position defined by the above-described operation can be performed.

Figure 23:
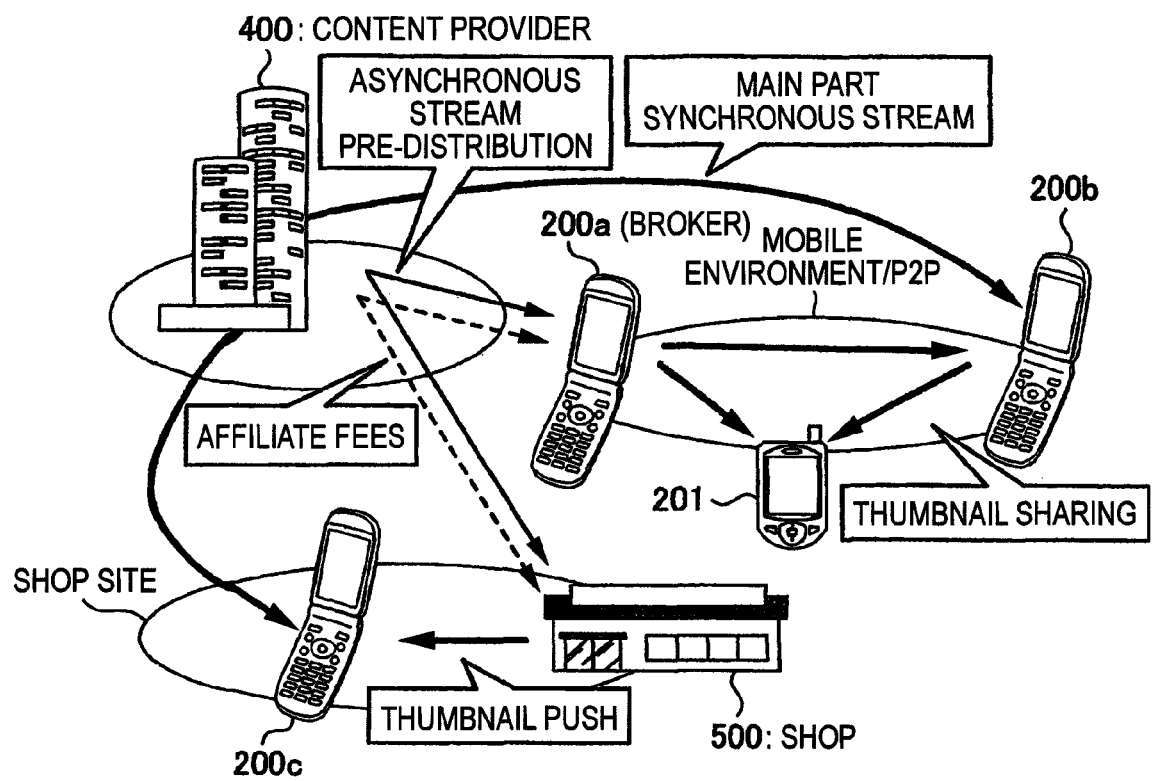
FIG. 23 is an illustrative view showing a schematic example of a system according to a fifth embodiment of the present invention.

Next, a fifth embodiment of the present invention will be described with reference to the schematic view of a system of FIG. 23. In this embodiment, an affiliate structure is realized using an asynchronous stream Dw.

A content provider 400 is a content provider with a distribution server (not shown) in which a plurality of video contents V are accumulated, and is an affiliate supply source in this system. Specifically, for example, it corresponds to a movie production company or a video content production company. A server installed within the content provider 400 has the same function as the recorder 100 shown in FIG. 5. That is, it has a function for generating, accumulating, and distributing an asynchronous stream Dw. In this example, the asynchronous stream Dw is obtained by extracting a plurality of parts of main part video contents V and has a meaning of a main part digest.

A shop 500 is an affiliate recipient in this system and corresponds to, for example, a restaurant or a goods shop. Within the shop, a server capable of transmitting (push distributing) a file to a portable telephone terminal 200c possessed by a guest by means of a near field wireless link or etc. is installed.

A broker is an affiliate recipient and an owner of a portable telephone terminal 200a. The portable telephone terminal 200a has a function for communicating with another portable telephone terminal 200b, a communication terminal 201, or etc. using a portable telephone communication network 2 or P2P (Peer To Peer).

In this system, first, the content provider 400 distributes a plurality of asynchronous streams Dw (thumbnails) as a main content digest to the shop 500 or the broker as the affiliate recipient. Then, in the shop 500, each asynchronous stream Dw distributed from the content provider 400 is push-distributed to the portable telephone terminal 200c possessed by the guest. The broker performs an operation for sharing the thumbnails distributed from the content provider 400 with the owner of the portable telephone terminal 200b and the owner of the communication terminal 201.

Then, the owner of the portable telephone terminal 200c receiving the thumbnails push-distributed from the shop 500, the owner of the portable telephone terminal 200b, or the owner of the communication terminal 201 sharing the thumbnails with the broker view the thumbnails. When a viewer of a thumbnail image can purchase and view main part contents by selecting, for example, a menu of "Purchase a sequel" or etc. when desiring to view a sequel of the thumbnail image, that is, a main part image. In this case, a mechanism at the terminal side can be realized by a function shown in FIG. 5, etc. That is, by acquiring a synchronous stream existing in the next interval of an asynchronous stream Dw being viewed by the user, the viewer can view an image of main part contents as the sequel of the thumbnail image.

When a target person to which a manager or broker of the shop 500 performs the thumbnail distribution purchases the main part contents, an affiliate (fees) is provided from the content provider 400.

In the present invention as described above, a system for providing an affiliate can be constructed using pre-accumulation of asynchronous streams Dw and a mechanism of seamless coupling of the asynchronous streams Dw and synchronous streams.

Next, a sixth embodiment of the present invention will be described with reference to the schematic view of a system of FIG. 24. In this embodiment, the present invention is applied to a system configured by monitoring cameras, a server for accumulating images captured by the monitoring cameras, and a portable telephone terminal for displaying the images captured by the cameras.

Figure 24:
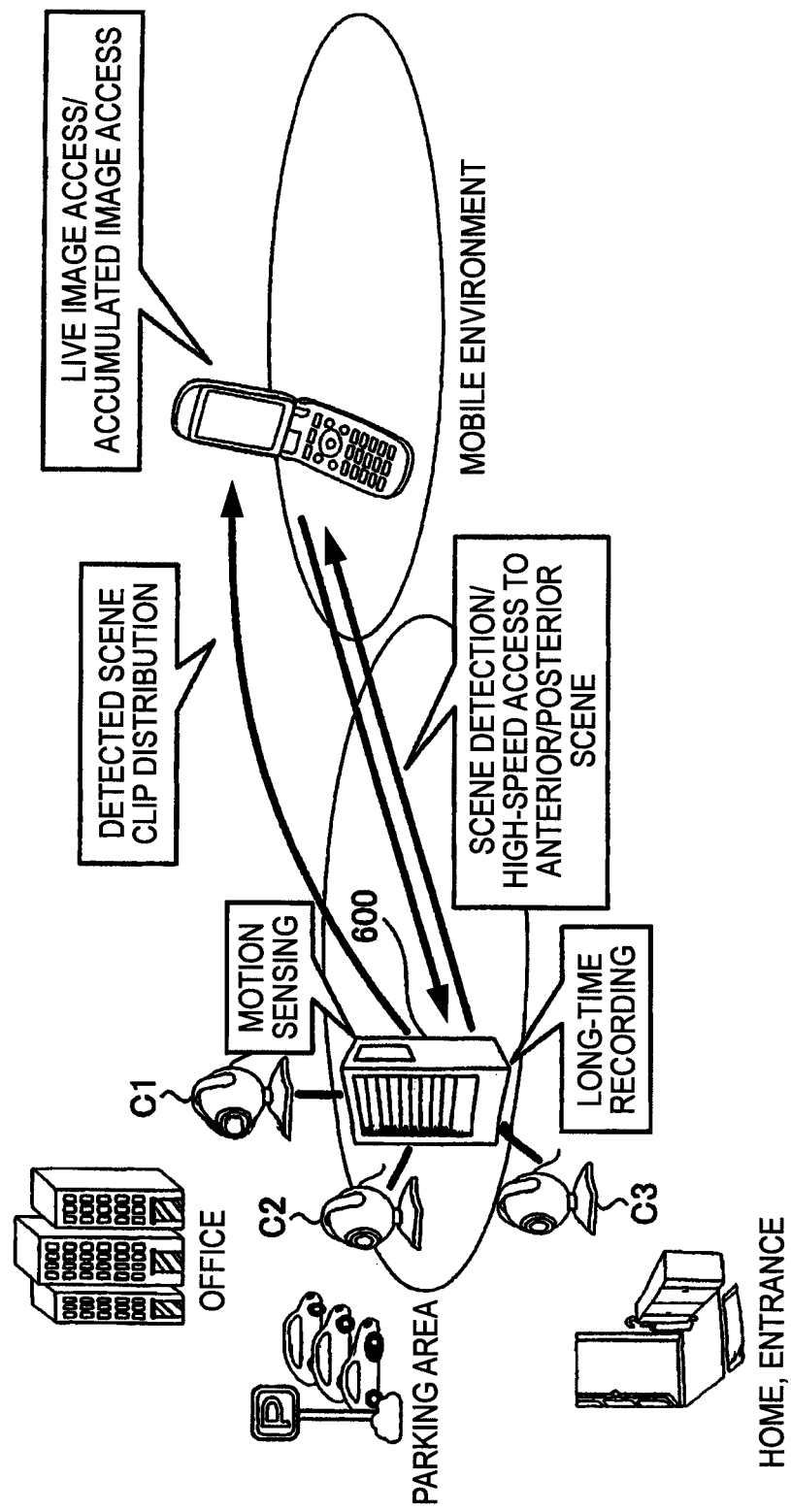
FIG. 24 is an illustrative view showing a schematic example of a system according to a sixth embodiment of the present invention.

Monitoring cameras C1 to C4 shown in FIG. 24 are cameras having a motion sensing function and output captured images to a server 600 when constantly photographing areas of an officer a parking area, a home, an entrance, etc. set as monitoring target areas. The server 600 records the captured images sent from the monitoring cameras C1 to C4 in a recording device (not shown), etc. Then, when the monitoring cameras C1 to C4 perform motion sensing, an asynchronous stream Dw having a predetermined time length is generated by taking the motion sensing as a trigger and distributed as a detected scene clip to a portable telephone terminal 200d.

An observer of a monitoring area as an owner of the portable telephone terminal 200d reproduces the detected scene clip distributed from the server 600. When a scene of interest exists, the observer performs an operation for viewing its sequel. As the operation for viewing the sequel, any action for expressing the sequel view is possible and an operation for continuously viewing a specific detected scene without performing a skip operation, etc. is possible.

When the above-described operation is performed, a synchronous stream session with the server 600 is started and images accumulated in the server or live images captured by the monitoring cameras C1 to C4 are distributed to the portable telephone terminal 200d.

By making the above-described configuration, the observer searches for a scene of interest by reproducing a detected scene clip distributed from the server 600. When there is a desired scene whose details are checked, the observer can check its sequel using a streaming-distributed image.

Thereby, since the portable telephone terminal 200d possessed by the observer does not need to continue to constantly view images captured by the monitoring cameras C1 to C4, the number of communications to be performed in the case of captured image acquisition is reduced significantly. That is, the communication cost can be reduced. The observer can sort only a scene required to check details, thereby reducing a monitoring time.

In each embodiment described so far, an example of using the portable telephone terminal 200 as a communication terminal for reproducing an asynchronous stream Dw or a synchronous stream has been described, but it is not limited thereto. For example, any device having a communication function can be applied to a portable terminal of FDA (Personal Digital Assistants), or etc., a game machine, a car navigation device, a personal computer, or etc. In each embodiment described above, a server is applied to the recorder 100, but actually a server or a car navigation device may be applied.

In each embodiment described above, a series of processes can be executed by hardware, but may be executed by software. When the series of processes are executed by the software, a program configuring the software is installed and executed in a computer mounted in dedicated hardware, a universal personal computer, or etc.

Not only a function of the above-described embodiment can be realized by executing program codes read by a computer, but also there is included the case where an OS or etc. operating on a computer can partially or totally perform an actual process on the basis of a program code command and the function of the above-described embodiment is realized by the process.

In the present specification, the steps of describing a program configuring software include not only processes to be performed in chronological order along a described sequence, but also processes to be executed in parallel or individually without processing in the chronological order.

What is claimed is:

1. A communication terminal comprising:
a communicator configured to transmit and receive data to and from a server storing video contents;
an accumulator configured to accumulate a plurality of partial streams extracted from different time positions within the video contents received through the communicator as asynchronous streams;
a decoder configured to decode at least one of the asynchronous streams and synchronous streams that are not extracted as the asynchronous streams from the video contents, the synchronous streams being streaming-distributed from the server; and
a controller configured to acquire streams having time position information after a reproduction time position of the at least one of the asynchronous streams and the synchronous streams decoded by the decoder while the at least one of the asynchronous streams and the synchronous streams are reproduced on a display, and control the display to display the acquired streams after the reproduction,
wherein the plurality of asynchronous streams have a predetermined time length, respectively,
wherein the controller is configured to request the server to transmit the synchronous stream when the reproduction time position of the asynchronous streams exceeds a predetermined time position; and
wherein the communication terminal further comprises:
a first acquisition unit, configured to read the asynchronous streams from the accumulator, and convert a timestamp assigned to the read asynchronous streams into a uniform timestamp within the communication terminal;
a first buffer, configured to temporarily store the synchronous streams distributed from the server;
a second acquisition unit, configured to read the synchronous streams from the first buffer, and convert a timestamp assigned to the read synchronous streams into the uniform timestamp; and
a second buffer, configured to temporarily store the asynchronous streams acquired by the first acquisition unit and the synchronous streams acquired by the second acquisition unit, and output the stored asynchronous streams and the stored synchronous streams to the decoder.

2. The communication terminal according to claim 1, wherein
the controller is configured to refer a scenario file transmitted from the server, the scenario file including: repository information of the video contents on the server; time position information prescribing the plurality of asynchronous streams; and correspondence information between the time position information and a reproduction time position within the video contents.

3. The communication terminal according to claim 2, wherein
in a case that a layer structure is defined in the plurality of asynchronous streams in the scenario file, the controller is configured to acquire of a plurality of asynchronous streams defined in a first layer as the highest layer in the layer structure from the server, and acquire a plurality of asynchronous streams defined in a second layer as a lower layer than the first layer from the server according to the reproduction time position.

4. The communication terminal according to claim 3, wherein
the accumulator is configured to accumulate the asynchronous streams before the decoding performed by the decoder.

5. The communication terminal according to claim 4, wherein
in a case that the reproduction time position of the asynchronous streams exceeds a predetermined threshold, the synchronous streams that the server is requested to acquire are streams temporally continuous to the asynchronous streams.

6. The communication terminal according to claim 3, wherein
the controller is configured to:
request the server to acquire the synchronous streams, and
request the server to acquire a plurality of asynchronous streams having a time position different from the reproduction time position of the synchronous streams during the reproduction on the display after a predetermined time has elapsed from a start of the synchronous stream acquisition through the communicator.

7. A content reproduction system comprising:
a server comprising:
a storage configured to accumulate video contents;
a first generator configured to extract a plurality of partial streams from different time positions within the video contents accumulated in the storage and generate a plurality of asynchronous streams; and
a first communicator configured to transmit at least one of the asynchronous streams generated by the first generator and synchronous streams not extracted as the asynchronous streams from the video contents; and
a communication terminal comprising:
a second communicator configured to transmit and receive data to and from the server;
an accumulator configured to accumulate the asynchronous streams received through the second communicator;
a decoder configured to decode the at least one of the asynchronous streams and the synchronous streams transmitted from the server; and
a controller configured to acquire streams having time position information after a reproduction time position of the at least one of the asynchronous streams and the synchronous streams decoded by the decoder while the at least one of the asynchronous streams and the synchronous streams are reproduced on a display, and control the display to display the acquired streams after the reproduction,
wherein the content reproduction system further comprises a second generator configured to generate a scenario file including: time position information of the asynchronous streams; and correspondence information between the time position information and reproduction position information within the video contents,
the second generator is configured to generate the scenario file in which a first layer is defined as a highest layer for a plurality of asynchronous streams separated by a temporal distance among the asynchronous streams generated by the first generator, and a second layer is defined as a lower layer than the first layer for a plurality of asynchronous streams whose temporal distances are close among the asynchronous streams except the asynchronous streams to which the first layer is assigned.

8. A content reproduction system comprising:
a server comprising:
- a storage configured to accumulate video contents;
- a first generator configured to extract a plurality of partial streams from different time positions within the video contents accumulated in the storage and generate a plurality of asynchronous streams; and
- a first communicator configured to transmit at least one of the asynchronous streams generated by the first generator and synchronous streams not extracted as the asynchronous streams from the video contents; and a communication terminal comprising:
- a second communicator configured to transmit and receive data to and from the server;
- an accumulator configured to accumulate the asynchronous streams received through the second communicator;
- a decoder configured to decode the at least one of the asynchronous streams and the synchronous streams transmitted from the server; and
- a controller configured to acquire streams having time position information after a reproduction time position of the at least one of the asynchronous streams and the synchronous streams decoded by the decoder while the at least one of the asynchronous streams and the synchronous streams are reproduced on a display, and control the display to display the acquired streams after the reproduction, wherein the content reproduction system further comprises a second generator configured to generate a scenario file including: time position information of the asynchronous streams; and correspondence information between the time position information and reproduction position information within the video contents, the first generator is configured to change a temporal interval for extracting the asynchronous streams from the video contents and a time length of the asynchronous streams according to content of the video contents.

9. The content reproduction system of claim 8, wherein the first generator is configured to change a temporal interval for extracting the asynchronous streams from the video contents and the time length of the asynchronous streams on the basis of a scene analysis result when scene analysis of the video contents is performed.

* * * * *